US 12,066,340 B2

(12) United States Patent
Hong et al.

(10) Patent No.: US 12,066,340 B2
(45) Date of Patent: Aug. 20, 2024

(54) FORCE SENSOR PREVENTING MALFUNCTION DUE TO COMPONENT INTERFERENCE AND DISPLAY DEVICE INCLUDING THE SAME

(71) Applicant: SAMSUNG DISPLAY CO., LTD., Yongin-si (KR)

(72) Inventors: Won Ki Hong, Suwon-si (KR); Tae Hee Lee, Hwaseong-si (KR); Sung Kook Park, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/356,208

(22) Filed: Mar. 18, 2019

(65) Prior Publication Data

US 2019/0353540 A1   Nov. 21, 2019

(30) Foreign Application Priority Data

May 17, 2018   (KR) ........................ 10-2018-0056273

(51) Int. Cl.
  *G06F 3/041*   (2006.01)
  *G01L 1/20*   (2006.01)
(52) U.S. Cl.
  CPC .............. *G01L 1/205* (2013.01); *G06F 3/041* (2013.01); *G06F 2203/04105* (2013.01)
(58) Field of Classification Search
  CPC ..... G01L 1/18; G01L 1/20; G01L 1/22; G06F 3/041; G06F 3/0412; G06F 3/0414;
  (Continued)

(56) References Cited

U.S. PATENT DOCUMENTS 8,654,524 B2   2/2014   Pance et al.
9,274,660 B2   3/2016   Bernstein et al.
  (Continued)

FOREIGN PATENT DOCUMENTS

CN   108027683   5/2018
EP   2175344   4/2010
  (Continued)

OTHER PUBLICATIONS

Partial European Search Report dated Oct. 21, 2019 corresponding to European Application No. 19174990.2.
  (Continued)

*Primary Examiner* — Ke Xiao
*Assistant Examiner* — Nelson Lam
(74) *Attorney, Agent, or Firm* — Chau & Associates, LLC

(57) ABSTRACT

A display device includes a display panel and a first force sensor. The first force sensor is disposed adjacent to a first edge of the display panel and extends along the first edge. The first force sensor includes a plurality of first sensing regions and a second sensing region disposed closer to the second end of the first force sensor than the first sensing regions. The first sensing regions are disposed closer to a first end of the first force sensor than the second sensing region, and the second sensing region. The second sensing region is disposed closer to a second end of the first force sensor than the first sensing regions. The second sensing region has a larger area than each of the first sensing regions.

36 Claims, 18 Drawing Sheets

(58) Field of Classification Search
CPC .................... G06F 3/044; G06F 3/045; G06F 2203/04104; G06F 2203/04105
USPC .................................................. 345/173–179
See application file for complete search history.

(56) References Cited

U.S. PATENT DOCUMENTS

| | | | |
|---|---|---|---|
| 9,664,577 B1* | 5/2017 | Liljegren | G01L 1/2287 |
| 10,963,080 B2* | 3/2021 | Lee | G06F 1/1626 |
| 11,320,925 B2* | 5/2022 | Hong | H01L 27/323 |
| 11,474,630 B2* | 10/2022 | Lee | G06F 1/1643 |
| 11,609,609 B2* | 3/2023 | Park | H10K 59/40 |
| 11,836,312 B2* | 12/2023 | Hong | G06F 1/1656 |
| 2005/0012723 A1 | 1/2005 | Pallakoff | |
| 2006/0007072 A1 | 1/2006 | Choi et al. | |
| 2006/0007172 A1* | 1/2006 | Baker | G01L 1/205 345/173 |
| 2006/0238517 A1* | 10/2006 | King | G06F 1/1626 345/173 |
| 2009/0323262 A1 | 12/2009 | Arita | |
| 2010/0134424 A1* | 6/2010 | Brisebois | G06F 3/03547 345/173 |
| 2012/0007837 A1* | 1/2012 | Kent | G06F 3/0436 345/177 |
| 2014/0028575 A1 | 1/2014 | Parivar et al. | |
| 2014/0253305 A1* | 9/2014 | Rosenberg | G06F 3/016 340/407.2 |
| 2014/0317722 A1* | 10/2014 | Tartz | G06F 21/32 726/19 |
| 2015/0334211 A1* | 11/2015 | Shin | G06F 1/1637 455/566 |
| 2016/0026316 A1* | 1/2016 | Choi | G06F 1/1626 345/173 |
| 2016/0139716 A1* | 5/2016 | Filiz | G06F 3/0416 345/174 |
| 2016/0162093 A1* | 6/2016 | Kim | G06F 3/0412 345/174 |
| 2016/0326407 A1* | 11/2016 | Iwasaki | C09J 133/08 |
| 2017/0336899 A1* | 11/2017 | Szeto | G06F 3/04883 |
| 2018/0188874 A1 | 7/2018 | Cho et al. | |
| 2018/0210598 A1* | 7/2018 | Lu | G06F 3/0414 |
| 2018/0210600 A1* | 7/2018 | Lee | G06K 9/00013 |
| 2020/0026422 A1* | 1/2020 | Seomoon | G06F 3/041 |
| 2020/0042132 A1* | 2/2020 | Kong | G06F 3/04142 |
| 2020/0057503 A1* | 2/2020 | Seomoon | G06F 3/016 |
| 2020/0058712 A1* | 2/2020 | Lee | G06F 3/0412 |
| 2021/0271366 A1* | 9/2021 | Seomoon | G06F 3/04817 |

FOREIGN PATENT DOCUMENTS

| | | |
|---|---|---|
| EP | 2784630 | 10/2014 |
| EP | 2945352 | 11/2015 |
| EP | 3093752 | 11/2016 |
| EP | 3252574 | 12/2017 |
| EP | 3312706 | 4/2018 |
| KR | 10-2015-0136934 | 12/2015 |
| KR | 10-2016-0013760 | 2/2016 |

OTHER PUBLICATIONS

Extended European Search Report Dated Mar. 6, 2020 In Corresponding European Application No. 19174990.2.
Office Action dated Feb. 16, 2022 in corresponding European Appln. No. EP 19174990.2 .
Notice of Allowance issued Oct. 21, 2022 in corresponding KR Application No. 10-2018-0056723.
Office Action issued on Sep. 6, 2023 in corresponding Application No. CN 201910379681.X.

* cited by examiner

FORCE SENSOR PREVENTING MALFUNCTION DUE TO COMPONENT INTERFERENCE AND DISPLAY DEVICE INCLUDING THE SAME

CROSS-REFERENCE TO RELATED APPLICATIONS

This application claims priority under 35 U.S.C. § 119 to Korean Patent Application No. 10-2018-0056273, filed on May 17, 2018, in the Korean Intellectual Property Office, the disclosure of which is incorporated by reference herein in its entirety.

TECHNICAL FIELD

Exemplary embodiments of the present disclosure relate to a force sensor and a display device including the same.

DISCUSSION OF THE RELATED ART

Electronic devices that provide images to a user, such as a smartphone, a tablet PC, a digital camera, a notebook computer, a navigation system, a smart television, etc., include a display device that displays images. The display device includes a display panel that generates and displays an image, as well as various input devices such as a touch panel that recognizes a touch input. Due to the convenience of using a touch input method, the touch panel is replacing existing physical input devices such as physical buttons.

In addition to utilization of a touch panel, research has been conducted to provide a force sensor in a display device and utilize the force sensor in place of existing physical buttons. However, the use of the force sensor may result in certain drawbacks, such as interference of the force sensor with other components of the display device.

SUMMARY

Exemplary embodiments of the present disclosure provide a force sensor which can prevent a malfunction due to interference with other components and that enables convenient input, as well as a display device including the force sensor.

According to an exemplary embodiment, a display device includes a display panel and a first force sensor. The first force sensor is disposed adjacent to a first edge of the display panel and extends along the first edge. The first force sensor comprises a plurality of first sensing regions and a second sensing region. The first sensing regions are disposed closer to a first end of the first force sensor than the second sensing region. The second sensing region is disposed closer to a second end of the first force sensor than the first sensing regions. The second sensing region has a wider area than each of the first sensing regions.

According to an exemplary embodiment, a display device includes a display panel and a first force sensor. The first force sensor is disposed adjacent to a first edge of the display panel, extends along the first edge, and has a recess disposed at an inner side of the first force sensor. The first force sensor includes a plurality of first sensing regions and a second sensing region. The recess is disposed between the first sensing regions and the second sensing region. The second sensing region has a larger area than each of the first sensing regions.

According to an exemplary embodiment, a force sensor includes a recess disposed at one side of the force sensor, a plurality of first sensing regions, and a second sensing region. The first sensing regions sense a first force. The second sensing region senses a second force. The recess is disposed between the first sensing regions and the second sensing region. The second sensing region has a larger area than each of the first sensing regions.

BRIEF DESCRIPTION OF THE DRAWINGS

The above and other features will become more apparent by describing in detail exemplary embodiments thereof with reference to the accompanying drawings, in which.

DETAILED DESCRIPTION

Figure 1:
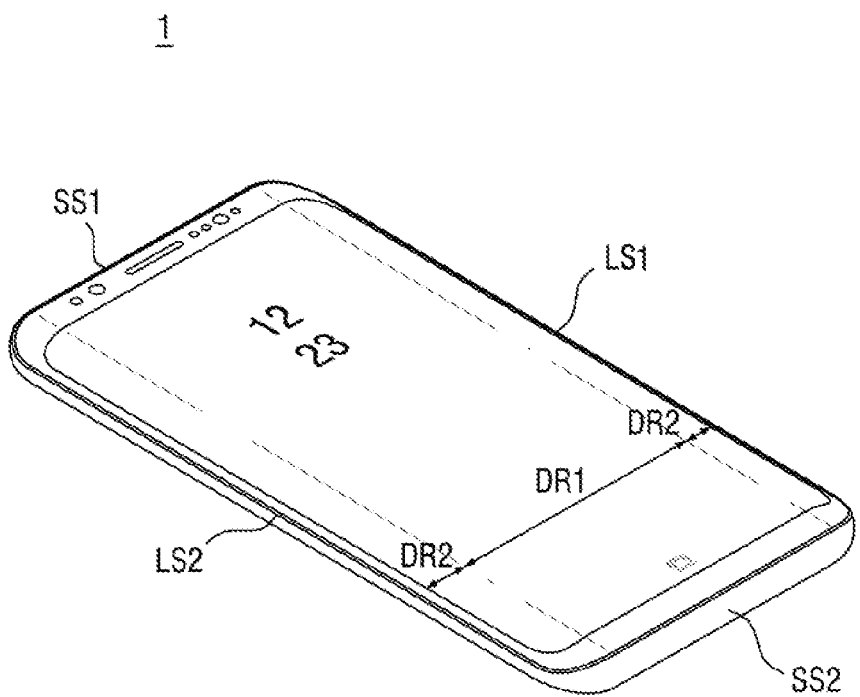
FIG. 1 is a perspective view of a display device according to an exemplary embodiment.

Exemplary embodiments will be described more fully hereinafter with reference to the accompanying drawings. Like reference numerals may refer to like elements throughout the accompanying drawings.

It will be understood that when a layer is referred to as being "on" another layer or substrate, it can be directly on the other layer or substrate, or intervening layers may also be present.

Although the terms "first", "second", etc. may be used herein to describe various elements, these elements should not be limited by these terms. These terms may be used to distinguish one element from another element. Thus, a first element discussed below may be termed a second element without departing from teachings of one or more exemplary embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)" etc., respectively.

Figure 2:
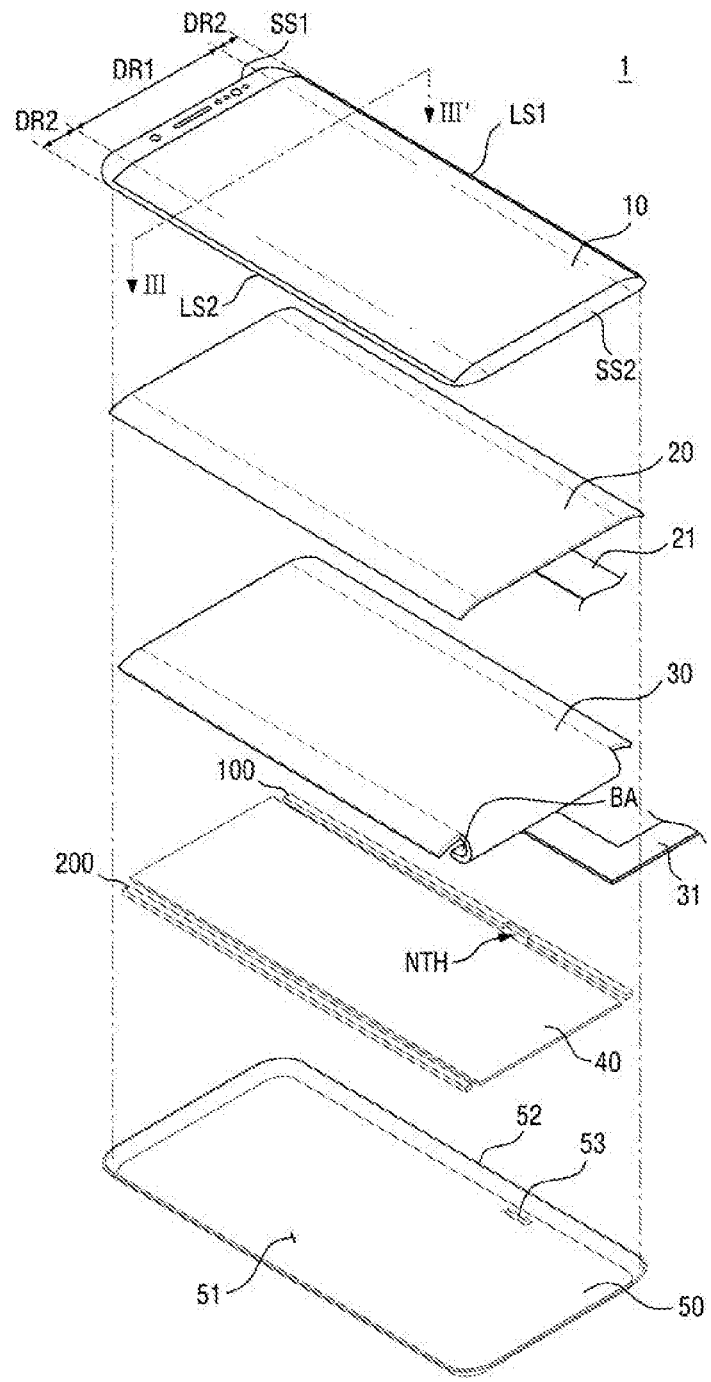
FIG. 2 is an exploded perspective view of the display device according to the exemplary embodiment of FIG. 1
Figure 3:
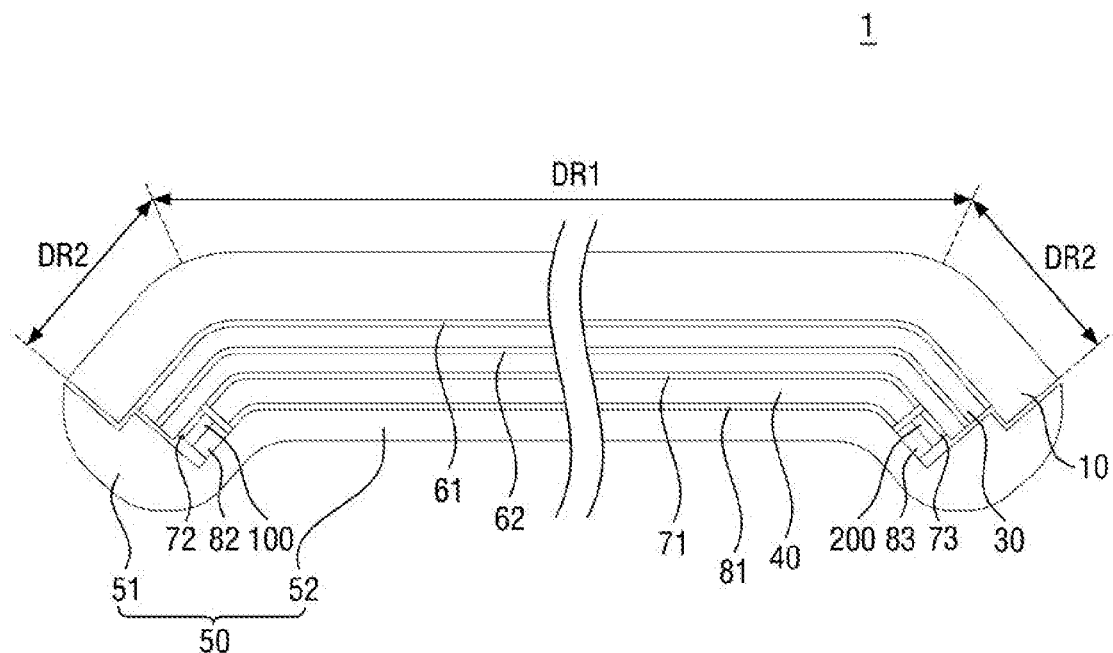
FIG. 3 is a cross-sectional view taken along line III-III' of FIG. 2.

FIG. 1 is a perspective view of a display device 1 according to an exemplary embodiment. FIG. 2 is an exploded perspective view of the display device 1 according to the exemplary embodiment of FIG. 1. FIG. 3 is a cross-sectional view taken along line III-III' of FIG. 2.

Referring to FIGS. 1 through 3, according to an exemplary embodiment, display device 1 includes a display panel 30 and force sensors 100 and 200 disposed near edges of the display panel 30. The display device 1 may further include a window 10 disposed above the display panel 30, a cover panel sheet 40 disposed below the display panel 30, and a bracket 50 (or a middle mold frame) disposed below the cover panel sheet 40.

Unless otherwise defined, the terms "above" and "upper surface" in a thickness direction, as used herein, denote a display surface side of the display panel 30, and the terms "below" and "lower surface" in the thickness direction, as used herein, denote an opposite side of the display panel 30 from the display surface side. In addition, the terms "above (upper)," "below (lower)," "left," and "right" in a planar direction refer to directions when a display surface placed in position viewed from above.

The display device 1 may have a substantially rectangular shape in plan view. For example, the display device 1 may have the shape of a rectangle with right-angled corners, or a rectangle with round corners in a plan view. The display device 1 may include long sides LS1 and LS2 and short sides SS1 and SS2. The long sides LS1 and LS2 are relatively longer than the short sides SS1 and SS2. In the rectangular display device 1 or members such as the display panel 30 included in the rectangular display device 1, a long side located on a right side in plan view will be referred to as a first long side LS1, a long side located on a left side in a plan view will be referred to as a second long side LS2, a short side located on an upper side in a plan view will be referred to as a first short side SS1, and a short side located on a lower side in a plan view will be referred to as a second short side SS2. The long sides LS1 and LS2 of the display device 1 may be, but are not limited to, about 1.5 to about 2.5 times longer than the short sides SS1 and SS2.

The display device 1 may include a first area DR1 and a second area DR2 lying in different planes. The first area DR1 lies in a first plane. The second area DR2 is connected to the first area DR1, and is bent or curved from the first area DR1. The second area DR2 may lie in a second plane located at a predetermined crossing angle to the first plane or may have a curved surface. The second area DR2 of the display device 1 is disposed around the first area DR1. The first area DR1 of the display device 1 is used as a main display surface. Both the first area DR1 and the second area DR2 can be used as a display area of the display device 1. A case in which the first area DR1 of the display device 1 is a flat portion and the second area DR2 is a curved portion will be described below as an example.

The second area DR2, which is the curved portion, may have a constant curvature or a varying curvature. The second area DR2 may be connected to the first area DR1.

The second area DR2 may be disposed at edges of the display device 1. In an exemplary embodiment, the second area DR2 may be disposed at both long edges (long sides LS1 and LS2) of the display device 1 which face each other. Alternatively, the second area DR2 may be disposed at one edge, at both short edges (short sides SS1 and SS2), at three edges, or at all edges of the display device 1.

The display panel 30 is a panel for displaying an image and may be, for example, an organic light emitting diode (OLED) display panel. In the following exemplary embodiments, a case in which an OLED display panel is applied as the display panel 30 will be described as an example. However, exemplary embodiments are not limited thereto, and other types of display panels such as, for example, a liquid crystal display (LCD) panel and an electrophoretic display panel may also be applied as the display panel 30. A display flexible circuit board 31 may be coupled to the display panel 30.

The display panel 30 includes a plurality of organic light emitting elements disposed on a substrate. The substrate may be a rigid substrate made of, for example, glass, quartz, etc., or may be a flexible substrate made of, for example, polyimide or other polymer resins. When a polyimide substrate is applied as the substrate, the display panel 30 can be bent, curved, folded, or rolled. In the drawings, the second short side SS2 of the display panel 30 is bent. In this case, the display flexible circuit board 31 may be attached to a bending area BA of the display panel 30.

The window 10 is disposed above the display panel 30. The window 10 protects the display panel 30 and allows for the transmission of light emitted from the display panel 30. The window 10 may be made of, for example, glass or transparent plastic.

The window 10 may be disposed such that it overlaps the display panel 30 and covers the entire surface of the display panel 30. The window 10 may be larger than the display panel 30. For example, the window 10 may protrude outward from the display panel 30 at both short sides SS1 and SS2 of the display device 1. The window 10 may also protrude from the display panel 30 at both long sides LS1 and LS2 of the display device 1. However, the protruding distance of the window 10 may be greater at both short sides SS1 and SS2.

In exemplary embodiments, the display device 1 may further include a touch member 20 disposed between the display panel 30 and the window 10. The touch member 20 may be of a rigid panel type, a flexible panel type, or a film type. The touch member 20 may have substantially the same size as the display panel 30 and may overlap the display panel 30. In an exemplary embodiment, side surfaces of the touch member 20 may be aligned with side surfaces of the display panel 30 at all sides excluding the bent short side SS2 of the display panel 30. However, exemplary embodiments are not limited thereto. The display panel 30 and the touch member 20, and the touch member 20 and the window 10, may be bonded together by transparent bonding layers 61 and 62 such as, for example, optically clear adhesives (OCA) or optically clear resins (OCR). A touch flexible circuit board 21 may be coupled to the touch member 20.

In exemplary embodiments, the touch member 20 can be omitted. In this case, the display panel 30 and the window 10 may be bonded together by an OCA or an OCR. In exemplary embodiments, the display panel 30 may include a touch electrode portion.

The cover panel sheet 40 and the force sensors 100 and 200 are disposed below the display panel 30. The cover panel sheet 40 and the force sensors 100 and 200 may be attached to a lower surface of the display panel 30 by bonding layers 71, 72 and 73 such as, for example, force-sensitive adhesive layers or adhesive layers.

The cover panel sheet 40 is disposed such that it overlaps a central portion of the display panel 30. The cover panel sheet 40 has a size substantially similar to that of the display panel 30, but may expose the lower surface of the display panel 30 by a predetermined width in the vicinity of both long sides LS1 and LS2 where the force sensors 100 and 200 are disposed.

The cover panel sheet 40 may perform a heat dissipating function, an electromagnetic wave shielding function, a pattern detection preventing function, a grounding function, a buffering function, a strength enhancing function, and/or a digitizing function. The cover panel sheet 40 may include a functional layer having at least one of the above functions. The functional layer may be provided in various forms such as, for example, a layer, a membrane, a film, a sheet, a plate, and a panel. The cover panel sheet 40 may include one functional layer or a plurality of functional layers. For example, the cover panel sheet 40 may include a buffer sheet, a graphite sheet, and a copper sheet stacked sequentially from top to bottom.

The force sensors 100 and 200 may be disposed such that they overlap at least one edge of the display panel 30. A plurality of force sensors 100 and 200 may be provided. As illustrated in the drawings, the force sensors 100 and 200 may include a first force sensor 100 overlapping a first long edge (first long side LS1) of the display panel 30 and a second force sensor 200 overlapping a second long edge (second long side LS2) of the display panel 30. The force sensors 100 and 200 may be disposed in the second area DR2 (e.g., the curved portion) of the display device 1. However, exemplary embodiments are not limited thereto. For example, in exemplary embodiments, the force sensors 100 and 200 may be disposed in an area other than the second area DR2.

The first and second force sensors 100 and 200 may respectively be attached to portions of the lower surface of the display panel 30 near both long edges (long sides LS1 and LS2) of the display panel 30 exposed by the cover panel sheet 40. In an exemplary embodiment, the force sensors 100 and 200 are disposed in the second area DR2 of the display device 1 and are not disposed in the first area DR1. However, exemplary embodiments are not limited to this case. For example, in exemplary embodiments, the force sensors 100 and 200 may also be disposed in the second area DR2 and extended in a width direction to part of the first area DR1.

Although the force sensors 100 and 200 are overlapped by the display panel 30, an area of the display panel 30 which overlaps the force sensors 100 and 200 may be, in an exemplary embodiment, a non-display area around the display area. That is, in an exemplary embodiment, the force sensors 100 and 200 are overlapped by the non-display area of the display panel 30. An outermost black matrix may be disposed in the non-display area of the display panel 30 around the display area. In addition, although the force sensors 100 and 200 and the touch member 20 overlap, an area of the touch member 20 which overlaps the force sensors 100 and 200 may be a peripheral area in which a touch electrode is not disposed.

In exemplary embodiments, the force sensors 100 and 200 and the cover panel sheet 40 do not overlap in the thickness direction. The force sensors 100 and 200 will be described in detail later.

The bracket 50 is disposed below the force sensors 100 and 200 and the cover panel sheet 40. The bracket 50 may be, for example, a storage container or a protective container that houses other components. For example, the bracket 50 may house the window 10, the touch member 20, the display panel 30, the force sensors 100 and 200, and the cover panel sheet 40.

The bracket 50 may include a bottom portion 51 and sidewalls 52 extending from sides of the bottom portion 51.

The bottom portion 51 of the bracket 50 faces the force sensors 100 and 200 and the cover panel sheet 40. The force sensors 100 and 200 and the cover panel sheet 40 may be attached to the bottom portion 51 of the bracket 50 by bonding layers 81, 82 and 83. The bonding layers 81, 82 and 83 may be, for example, force-sensitive adhesive layers or adhesive layers. In an exemplary embodiment, the bonding layers 82 and 83, which attach the force sensors 100 and 200 to the bottom portion 51 of the bracket 50, may be waterproof tapes.

The sidewalls 52 of the bracket 50 face side surfaces of the touch member 20, the display panel 30, the force sensors 100 and 200, and the cover panel sheet 40. Upper ends of the sidewalls 52 of the bracket 50 face the window 10. An outer surface of the bracket 50 may be aligned with an outer surface of the window 10. The window 10 may be attached to the bracket 50 with, for example, a waterproof tape.

The bracket 50 may include a connect hole 53, through which a display connector 35 (see FIG. 4) passes, near the first long edge (first long side LS1). The connect hole 53 may penetrate the bottom portion 51 of the bracket 50 in the thickness direction and may have, for example, a slit shape. The first force sensor 100 may have a recess NTH near the connect hole 53 of the bracket 50. The recess NTH may have the shape of a notch, and thus may also be referred to herein as a notch-shaped recess NTH. This will be described in detail with reference to FIGS. 4 and 5.

Figure 4:
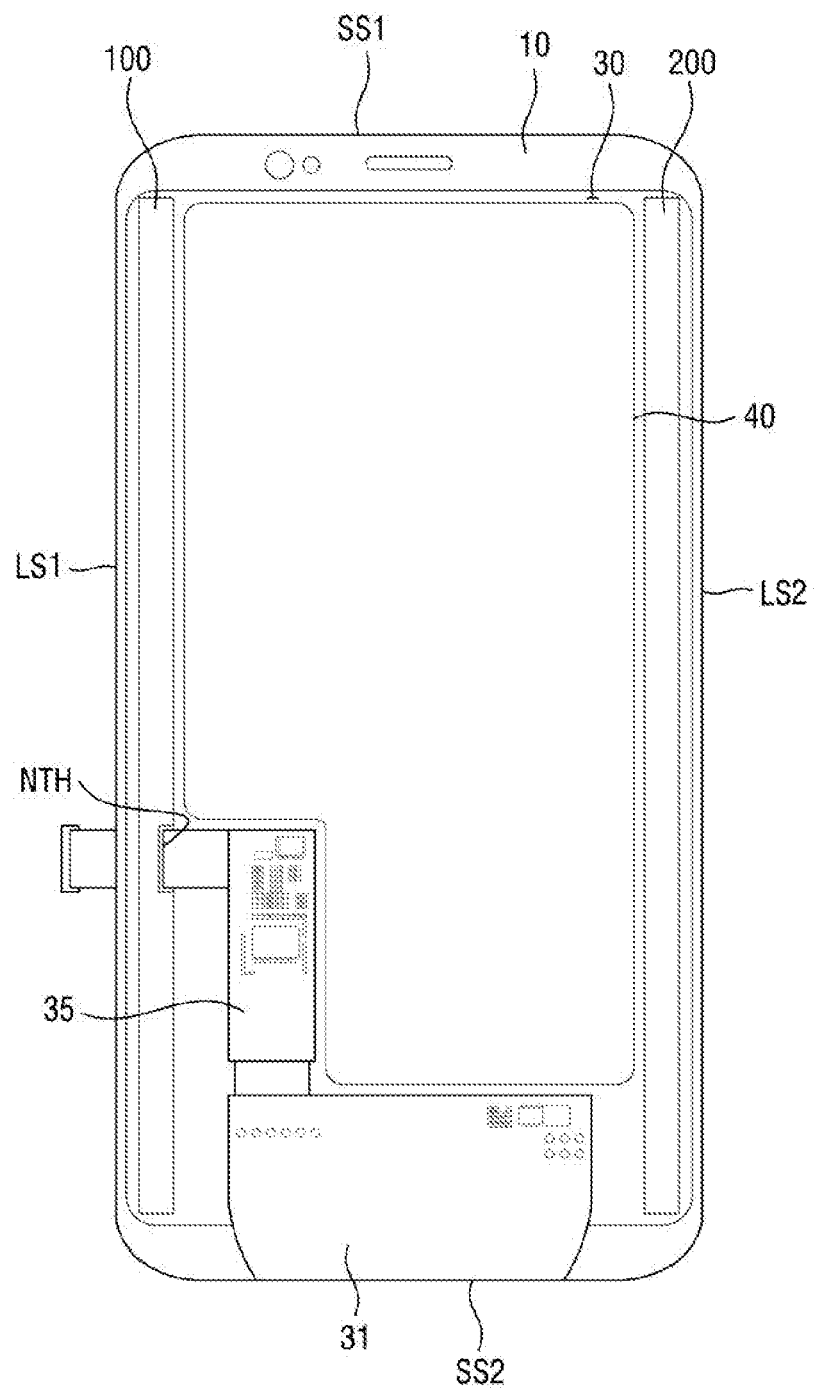
FIG. 4 is a bottom view of the display device according to the exemplary embodiment of FIG. 1.
Figure 5:
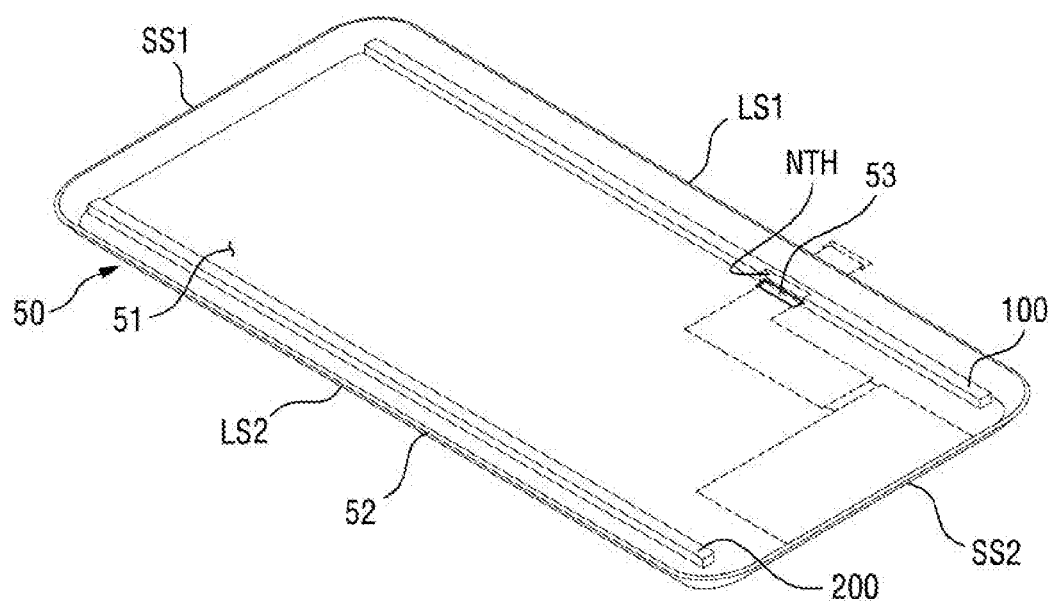
FIG. 5 is a perspective view illustrating the arrangement of a bracket and force sensors according to an exemplary embodiment.

FIG. 4 is a bottom view of the display device 1 according to an exemplary embodiment. FIG. 4 illustrates the bottom shape of the display device 1 excluding the bracket 50. In FIG. 4, the display device 1 is turned upside down. Thus, the left and right sides are reversed, and the positions of the first long side LS1 and the second long side LS2 are also reversed. FIG. 5 is a perspective view illustrating the arrangement of the bracket 50 and the force sensors 100 and 200 according to an exemplary embodiment.

Referring to FIGS. 4 and 5, the display flexible circuit board 31 is connected to the display connector 35. The display flexible circuit board 31 is housed in the bracket 50, and the display connector 35 comes out of the bracket 50 through the connect hole 53 so as to be connected to an external terminal. When the first force sensor 100 overlaps or physically contacts a space through which the display connector 35 comes out, there is a possibility that the first force sensor 100 will malfunction. Therefore, in exemplary embodiments, the first force sensor 100 includes the recess NTH at a corresponding position to avoid interfering with the display connector 35. Since the first force sensor 100 is recessed outward due to the recess NTH, in exemplary embodiments, the first force sensor 100 does not overlap or physically contact the display connector 35 passing through the connect hole 53. The recess NTH of the first force sensor 100 disposed in the bracket 50 may bypass the connect hole 53 in an outward direction.

The display connector 35 may be made of, for example, a flexible circuit board. Although the display flexible circuit board 31 and the display connector 35 are formed as separate members and connected to each other in the drawings, the display flexible circuit board 31 itself may also pass through the connect hole 53 in exemplary embodiments.

Unlike the first force sensor 100, the second force sensor 200 may not include a notch-shaped recess. For example, in an exemplary embodiment, the first force sensor 100 includes the notch-shaped recess NTH, and the second force sensor 200 does not include the notch-shaped recess NTH.

The force sensors 100 and 200 will now be described in more detail.

Figure 6:
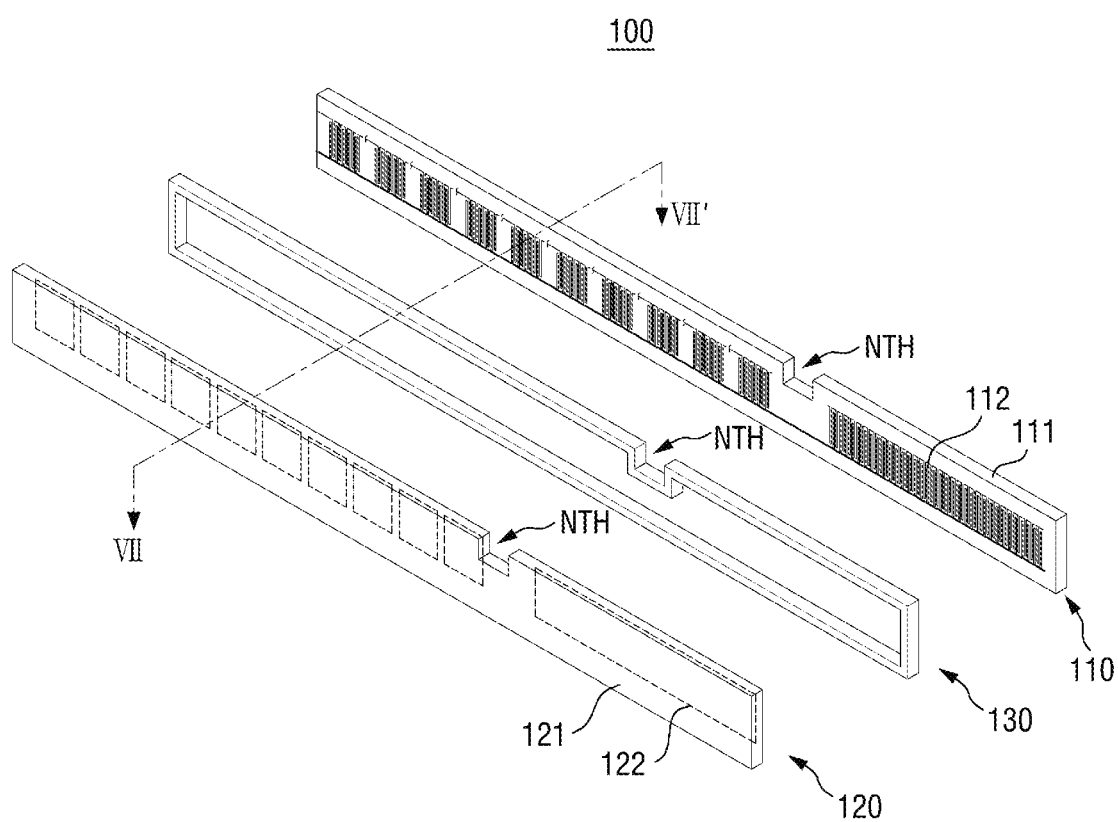
FIG. 6 is an exploded perspective view of a first force sensor according to an exemplary embodiment.
Figure 7:
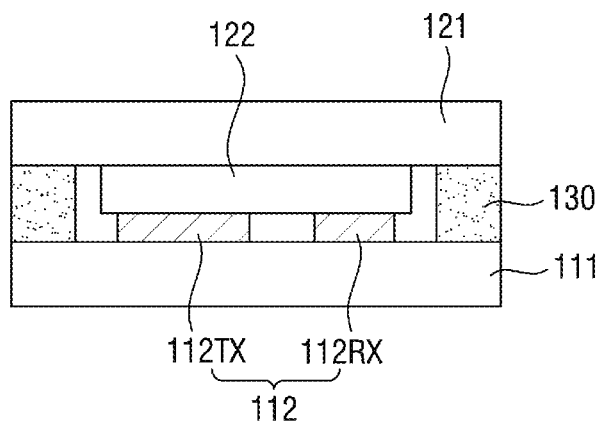
FIG. 7 is a cross-sectional view taken along line VII-VII' of FIG. 6.
Figure 8:
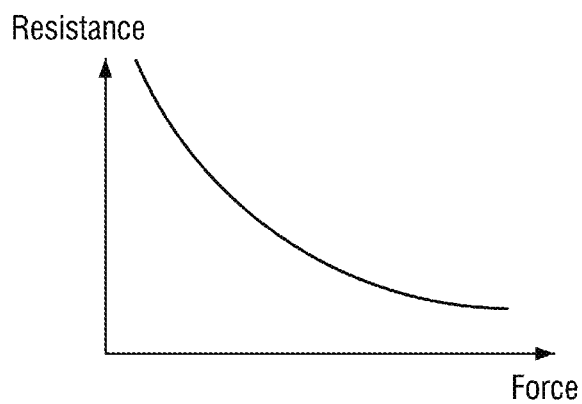
FIG. 8 is a graph illustrating the relationship between the electrical resistance of a force sensing layer and a force.

FIG. 6 is an exploded perspective view of the first force sensor 100 according to an exemplary embodiment. FIG. 7 is a cross-sectional view taken along line VII-VII' of FIG. 6. FIG. 8 is a graph illustrating the relationship between the electrical resistance of a force sensing layer 122 and a force. In FIGS. 6 through 8, the structure and operation of the first force sensor 100 are described as an example. It is to be understood that the second force sensor 200 has substantially the same structure and operation as the first force sensor 100, except for the presence of the recess NTH. Accordingly, for convenience of explanation, a duplicate description of the structure and operation of the second force sensor 200 will be omitted herein.

Referring to FIGS. 6 through 8, the first force sensor 100 extends in one direction in a plane. A length of the first force sensor 100 in the extending direction is greater than a width of the first force sensor 100. The width of the first force sensor 100 may be between about 2 mm and about 6 mm. The length of the first force sensor 100 may be substantially similar to the lengths of the long sides LS1 and LS2 of the display device 1. The length of the first force sensor 100 may be, but is not limited to, about 80% to about 98% of the lengths of the long sides LS1 and LS2 of the display device 1. In an exemplary embodiment, the length of the first force sensor 100 may be in the range of about 50 mm to about 300 mm or in the range of about 100 mm to about 150 mm.

The first force sensor 100 includes a first substrate 110 and a second substrate 120 facing each other. The first substrate 110 includes a first base 111 and an electrode layer 112. The second substrate 120 includes a second base 121 and the force sensing layer 122. The first substrate 110 and the second substrate 120 are bonded together by a bonding layer 130. The first substrate 110 and the second substrate 120 may be, but are not limited to, films.

Each of the first base 111 and the second base 121 may include, for example, polyethylene, polyimide, polycarbonate, polysulfone, polyacrylate, polystyrene, polyvinyl chloride, polyvinyl alcohol, polynorbornene, or polyester. In an exemplary embodiment, each of the first base 111 and the second base 121 may be made of, for example, a polyethylene terephthalate (PET) film or a polyimide film.

The electrode layer 112 is disposed on a surface of the first base 111. Here, the surface of the first base 111 is a surface facing the second base 121. A thickness of the electrode layer 112 may be between about 2 um and about 8 um. For example, the thickness of the electrode layer 112 may be about 4 um in an exemplary embodiment. The electrode layer 112 includes a first electrode 112TX and a second electrode 112RX. The first electrode 112TX may be, for example, a driving electrode, and the second electrode 112RX may be, for example, a sensing electrode. The first electrode 112TX and the second electrode 112RX may be disposed adjacent to each other, but are spaced apart from each other so as not to short-circuit. For example, in an exemplary embodiment, the first electrode 112TX and the second electrode 112RX may be disposed adjacent to each other (e.g., directly adjacent to each other with no other components disposed therebetween) without contacting each other.

The first electrode 112TX and the second electrode 112RX may be disposed on the same layer. The first electrode 112TX and the second electrode 112RX may be made of the same material. For example, the first electrode 112TX and the second electrode 112RX may include a conductive material such as silver (Ag) or copper (Cu). The first electrode 112TX and the second electrode 112RX may be formed, for example, by a screen printing method.

In an exemplary embodiment, the first electrode 112TX may be formed as a single piece along the direction in which the first force sensor 100 extends, and the second electrode 112RX, which is separated from the first electrode 112TX, may be formed as a single piece along the direction in which the first force sensor 100 extends.

The force sensing layer 122 is disposed on a surface of the second base 121. Here, surface f the second base 121 is a surface facing the first base 111. The force sensing layer 122 may include a force sensitive material. The force sensitive material may include metal nanoparticles such as, for example, nickel, aluminum, tin or copper, or may include carbon. The force sensitive material may be provided in a polymer resin in the form of, but not limited to, particles. As illustrated in FIG. 8, the electrical resistance of the force sensing layer 122 decreases as the force increases. By using this characteristic, it is possible to sense whether the force has been applied, as well as the magnitude of the force.

For example, a surface of the force sensing layer 122 is in contact with or at least adjacent to surfaces of the first electrode 112TX and the second electrode 112RX. When force is applied to the first force sensor 100, the surface of the force sensing layer 122 is brought into contact with the surfaces of the first electrode 112TX and the second electrode 112RX at a corresponding portion. Therefore, the first electrode 112TX and the second electrode 112RX may be physically connected by the force sensing layer 122. The force sensing layer 122 lying between the first electrode 112TX and the second electrode 112RX may act as an electrical resistor.

When no force or little force is applied to the force sensing layer 122, the force sensing layer 122 has a high resistance. In this case, even if a driving voltage is applied to the first electrode 112TX, a current hardly flows to the second electrode 112RX. On the other hand, when a large force is applied to the force sensing layer 122, the resistance of the force sensing layer 122 is reduced, thus increasing the amount of current flowing between the first electrode 112TX and the second electrode 112RX.

Therefore, by sensing the amount of current or voltage at the second electrode 112RX after applying a driving voltage to the first electrode 112TX, it is possible to identify how much force has been applied to the force sensing layer 122.

The thickness of the force sensing layer 122 may be, but is not limited to, a thickness that is thicker than the electrode layer 112. For example, the thickness of the force sensing layer 122 may be between about 4 um and about 12 um. For example, the thickness of the force sensing layer 122 may be about 8 um.

The first force sensor 100 may further include the bonding layer 130 disposed between the first base 111 and the second base 121. The bonding layer 130 bonds the first base 111 and the second base 121. The bonding layer 130 may be disposed along the periphery of the first base 111 and the second base 121. In an exemplary embodiment, the bonding layer 130 may completely surround the periphery of the first base 111 and the second base 121, thus, sealing the first force sensor 100. That is, the bonding layer 130 may serve as a gasket. Further, the bonding layer 130 may also serve as a spacer that maintains a constant gap between the first base 111 and the second base 121. In exemplary embodiments, the bonding layer 130 does not overlap the electrode layer 112 and the force sensing layer 122.

A thickness of the bonding layer 130 may be in the range of about 5 um to about 50 um, or in the range of about 12 um to about 30 um.

The bonding layer 130 may be made of a force-sensitive adhesive layer or an adhesive layer. The bonding layer 130 may first be attached to one of the surface of the first base 111 and the surface of the second base 121, and then attached to the surface of the other base 111 or 121 in the process of assembling the first base 111 and the second base 121. Alternatively, a bonding layer may be provided on each of the surface of the first base 111 and the surface of the second base 121, and then the bonding layer of the first base 111 and the bonding layer of the second base 121 may be bonded together in the process of assembling the first base 111 and the second base 121.

The first force sensor 100 may be placed in the display device 1 such that the first base 111 having the electrode layer 112 faces the display panel 30. That is, the other surface (outer surface) of the first base 111 may be attached to the lower surface of the display panel 30, and the other surface (outer surface) of the second base 121 may be attached to the bracket 50. However, exemplary embodiments are not limited to this case. For example, in exemplary embodiments, the arrangement directions of the first base 111 and the second base 121 in the display device 1 may also be opposite to the directions described above.

Figure 9:
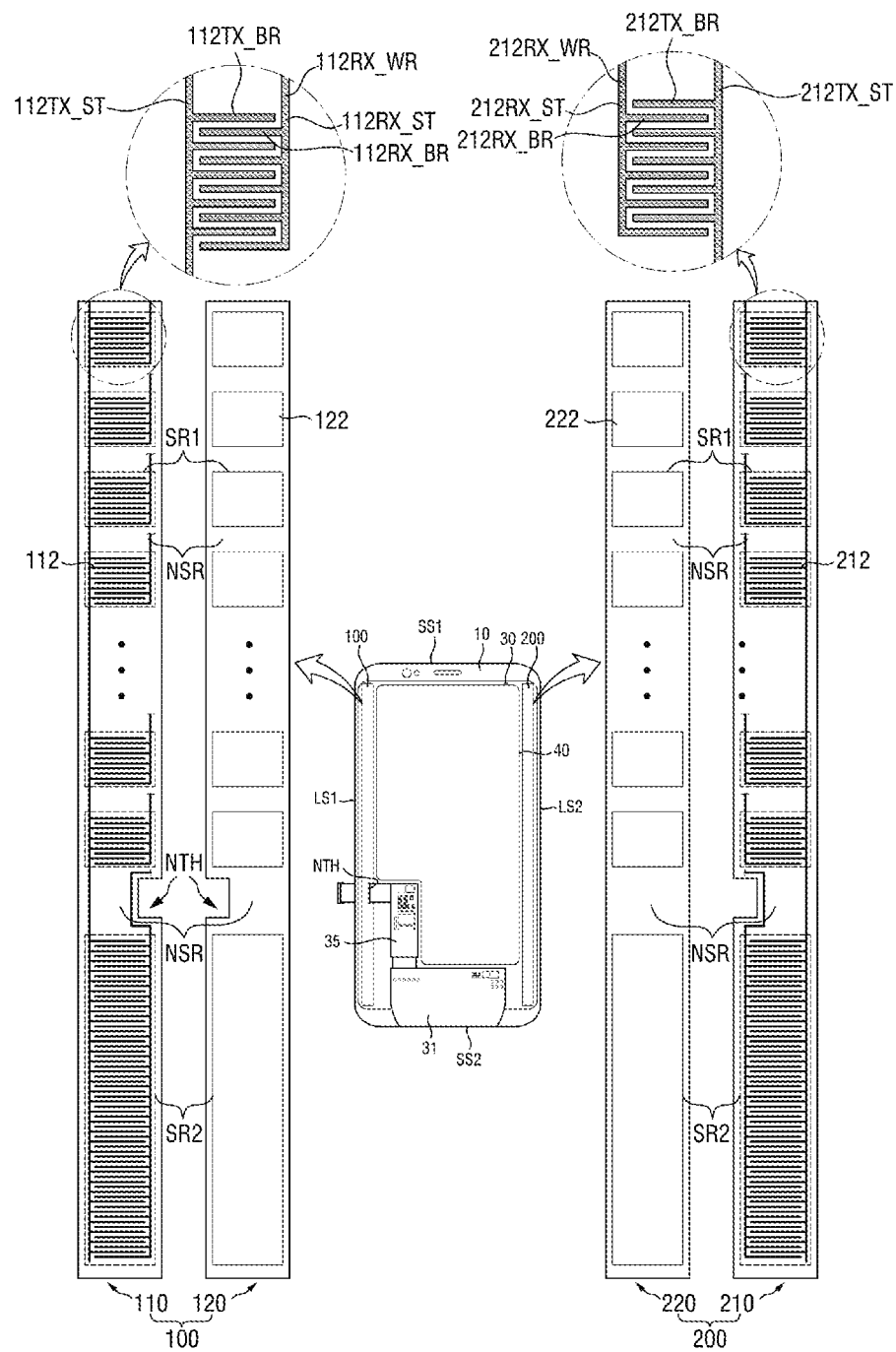
FIG. 9 is a layout view of a first force sensor and a second force sensor according to an exemplary embodiment.

FIG. 9 is a layout view of the first force sensor 100 and the second force sensor 200 according to an exemplary embodiment.

The arrangement of the first substrate 110 and the second substrate 120 of the first force sensor 100 is illustrated on the left side of FIG. 9, and the arrangement of a first substrate 210 and a second substrate 220 of the second force sensor 200 is illustrated on the right side of FIG. 9.

Referring to FIG. 9, each of the first force sensor 100 and the second force sensor 200 includes a plurality of sensing regions SR1 and SR2. The sensing regions SR1 and SR2 are regions capable of sensing forces. The sensing regions SR1 and SR2 may sense forces at their corresponding positions independently of each other. Similar to the first force sensor 100, the second force sensor includes an electrode layer 212.

The sensing regions SR1 and SR2 may be arranged in a longitudinal direction of each of the first force sensor 100 and the second force sensor 200. In an exemplary embodiment, the sensing regions SR1 and SR2 may be arranged in one row. Neighboring sensing regions SR1 and SR2 may be arranged continuously. Alternatively, the neighboring sensing regions SR1 and SR2 may be spaced apart from each other. That is, a non-sensing region NSR may be disposed between the sensing regions SR1 and SR2.

As shown in FIG. 9, in an exemplary embodiment, the first force sensor 100 is disposed adjacent to a first edge of the display panel 30 and extends along the first edge. The first force sensor 100 includes a plurality of first sensing regions SR1 disposed between a first end of the first force sensor 100 and a second end of the first force sensor 100. The second sensing region SR2 is disposed closer to the second end of the first force sensor 100 than the first sensing regions SR1, and has a wider area than each of the first sensing regions SR1.

In addition, in an exemplary embodiment, the second force sensor 200 is disposed adjacent to a second edge of the display panel 30. The second edge faces the first edge, and the second force sensor 200 extends along the second edge. The second force sensor 200 includes a plurality of first sensing regions SR1 disposed between a first end of the second force sensor 200 and a second end of the second force sensor 200, and a second sensing region SR2 disposed closer to the second end of the second force sensor 200 than the first sensing regions SR1 included in the second force sensor 200. The second sensing region SR2 included in the second force sensor 200 has a wider area than each of the first sensing regions SR1 included in the second force sensor 200.

Further, as shown in FIG. 9, in an exemplary embodiment, the first force sensor 100 includes the recess NTH disposed at an inner side of the first force sensor 100. The first force sensor 100 includes a plurality of first sensing regions SR1 disposed on a first side of the recess NTH and a second sensing region SR2 disposed on a second side of the recess NTH. The second sensing region SR2 disposed on the second side of the recess NTH has a wider area than each of the first sensing regions SR1 disposed on the first side of the recess NTH. The first electrode 112TX of the first force sensor 100 or a first electrode of the second force sensor 200, the second electrode 112RX of the first force sensor 100 or a second electrode of the second force sensor 200, and the force sensing layer 122 or 222, are disposed in each of the sensing regions SR1 and SR2. The second electrode 112RX of the first force sensor 100 or the second electrode of the second force sensor 200 serve as a sensing electrode that is a separate cell electrode disposed in each of the sensing regions SR1 and SR2, and the first electrode 112TX of the first force sensor 100 or the first electrode of the second force sensor 200 serve as a driving electrode and is a common electrode, all portions of which are electrically connected regardless of the sensing regions SR1 and SR2. The force sensing layer 122 or 222 may also be patterned and disposed as a separate layer in each of the sensing regions SR1 and SR2.

The sensing regions SR1 and SR2 may have different areas depending on their use. For example, the area of a second sensing region SR2 (e.g., a squeezing sensing region) that senses a squeezing force may be larger than the area of a first sensing region SR1. (e.g., a pressing sensing region) used in place of a physical button. The second sensing region SR2 has the same width as the first sensing region SR1, but may have a greater length (width in the extending direction of a force sensor) than the first sensing region SR1. The length of the second sensing region SR2 may be about three to about fifteen times the length of the first sensing region SR1. For example, the length of the first sensing region SR1 may be between about 4 mm and about 5 mm, and the length of the second sensing region SR2 may be between about 30 mm and about 60 mm.

In an exemplary embodiment, a plurality of first sensing regions SR1 may be arranged in a direction from an upper end toward a lower end of each of the first force sensor 100 and the second force sensor 200, and one second sensing region SR2 may be disposed near the lower end of each of the first force sensor 100 and the second force sensor 200. The positions of the first sensing regions SR1 and the second sensing region SR2 in the first force sensor 100 may be distinguished based on the recess NTH. For example, the first sensing regions SR1 may be disposed above the recess NTH, and the second sensing region SR2 may be disposed below the recess NTH. Thus, the recess NTH may separate the first sensing regions SR1 from the second sensing region SR2. The number of the first sensing regions SR1 disposed above the recess NTH may be selected from, but is not limited to, the range of 2 to 20 or the range of 5 to 15.

Although the second force sensor 200 does not have the recess NTH, it may have the first sensing regions SR1 and the second sensing region SR2 at positions corresponding to the first sensing regions SR1 and the second sensing region SR2 of the first force sensor 100. In an exemplary embodiment, the sensing regions SR1 and SR2 of the first force sensor 100 and the sensing regions SR1 and SR2 of the second force sensor 200 may be substantially symmetrical to each other in terms of number, area, gap, position, etc. However, exemplary embodiments are not limited thereto.

The recess NTH of the first force sensor 100 may be located in the middle or below the middle of the first force sensor 100 in the longitudinal direction of the first force sensor 100, as illustrated in FIG. 9. For example, a distance from the lower end of the first force sensor 100 to the recess NTH in a plan view may be about 30% to about 50% of the total length of the first force sensor 100. In an exemplary embodiment, the distance from the lower end of the first force sensor 100 to the recess NTH may be between about 50 mm and about 60 mm.

When the first force sensor 100 is placed in the display device 1, if a long side positioned on an outer side of the display device 1 is defined as an outer side, and a long side positioned on an inner side of the display device 1 is defined as an inner side, the recess NTH is formed at the inner side of the first force sensor 100. In an exemplary embodiment, a width of the recess NTH recessed inward from the inner side of the first force sensor 100 may be between about 1 mm and about 4 mm. In an exemplary embodiment, a width of the recess NTH recessed inward from the inner side of the first force sensor 100 may be about 2 mm. In an exemplary embodiment, a length of the recess NTH may be about equal to the width of the recess NTH. However, exemplary embodiments are not limited thereto. The length of the recess NTH may be about equal to or greater than that of the connect hole 53. When the first force sensor 100 is placed in the display device 1, a recessed region of the recess NTH may overlap the connect hole 53. The recessed shape of the recess NTH may be, for example, a rectangular shape or a square shape. However, the recessed shape of the recess NTH is not limited to the rectangular shape or the square shape. For example, in an exemplary embodiment, the recessed shape of the recess NTH may include a concave curve.

The first electrode 112TX of the first force sensor 100 or the first electrode of the second force sensor 200, and the second electrode 112RX of the first force sensor 100 or the second electrode of the second force sensor 200 may be, for example, comb-shaped electrodes. The first electrode 112TX of the first force sensor 100 or the first electrode of the second force sensor 200, and the second electrode 112RX of the first force sensor 100 or the second electrode of the second force sensor 200, may be arranged such that the comb shapes are engaged with each other.

For example, the first electrode 112TX of the first force sensor 100 or the first electrode of the second force sensor 200, and the second electrode 112RX of the first force sensor 100 or the second electrode of the second force sensor 200, may include a stem electrode (or a connection electrode) and branch electrodes (or finger electrodes). The first electrode 112TX of the first force sensor 100 or the first electrode of the second force sensor 200, and the second electrode 112RX of the first force sensor 100 or the second electrode of the second force sensor 200 may be arranged such that the branch electrodes are alternately disposed. This arrangement increases an area in which the first electrode 112TX of the first force sensor 100 or the first electrode of the second force sensor 200, and the second electrode 112RX of the first force sensor 100 or the second electrode of the second force sensor 200 face each other, thereby enabling effective force sensing.

For example, in an exemplary embodiment, the first electrode 112TX of the first force sensor 100 is structured to include a first stem electrode 112TX_ST extending in the longitudinal direction, and a plurality of first branch electrodes 112T_BR branching in the width direction from the first stem electrode 112TX_ST. Similarly, the first electrode of the second force sensor 200 is structured to include a first stem electrode 212TX_ST extending in the longitudinal direction, and a plurality of first branch electrodes 212TX_BR branching in the width direction from the first stem electrode 212TX_ST.

The first stem electrode 112TX_ST or 212TX_ST is disposed over the sensing regions SR1 and SR2 to provide a voltage (a driving voltage) to the sensing regions SR1 and SR2. The first stem electrode 112TX_ST or 212TX_ST extends up to the non-sensing region NSR between neighboring sensing regions SR1 and SR2, and electrically connects portions of the first stem electrode 112TX_ST or 212TX_ST which are disposed in the neighboring regions SR1 and SR2.

Figure 15:
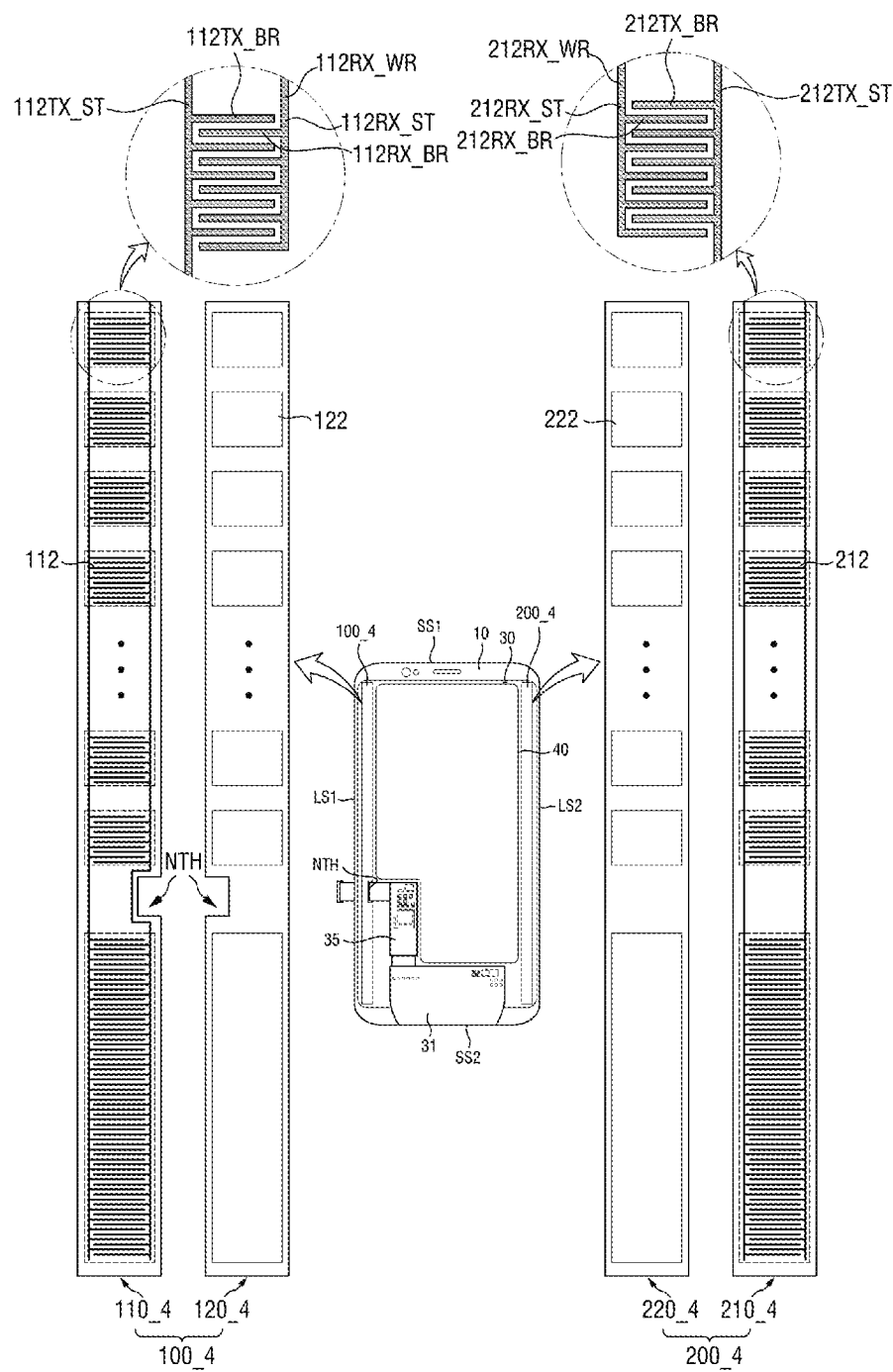
FIG. 15 is a layout view of a first force sensor and a second force sensor according to an exemplary embodiment.

The first electrode 112TX_ST of the first force sensor 100 may be disposed adjacent to the outer side of the first force sensor 100 which is opposite the inner side where the recess NTH is formed. However, exemplary embodiments are not limited to this case. For example, in an exemplary embodiment, the first stem electrode 112TX_ST of the first force sensor 100 may also be disposed on the inner side of the first force sensor 100 where the recess NTH is formed. In this case, the first stem electrode 112TX_ST of the first force sensor 100 may be bent several times along the shape of the recess NTH of the first force sensor 100 to bypass the recess NTH, and then extend to the lower end of the first force sensor 100, as illustrated in FIG. 15.

The first stem electrode 212TX_ST of the second force sensor 200 may be disposed adjacent to an outer side of the second force sensor 200 as illustrated in FIG. 9. However, exemplary embodiments are not limited thereto. For example, in an exemplary embodiment, the first stem electrode 212TX_ST of the second force sensor 200 may be disposed adjacent to an inner side of the second force sensor 200. Since the second force sensor 200 does not include the recess NTH, it may extend straight without being bent to bypass the recess NTH, on whichever side the second force sensor 200 is disposed.

The first branch electrodes 112TX_BR or 212TX_BR branch from the first stem electrode 112TX_ST or 212TX_ST and extend in the width direction. In an exemplary embodiment, the first branch electrodes 112TX_BR or 212TX_BR may be disposed in the sensing regions SR1 and SR2 and are not disposed in the non-sensing region NSR. In an exemplary embodiment, if a region in which the recess NTH is formed in the first force sensor 100 is the non-sensing region NSR, the first branch electrodes 112TX_BR is not disposed in the region. In an exemplary embodiment, in the second force sensor 200 structured symmetrically to the first force sensor 100, the first branch electrodes 212TX_BR are not disposed in a region corresponding to the recess NTH.

In one sensing region SR1 or SR2, neighboring first branch electrodes 112TX_BR or 212TX_BR may be spaced apart from each other by a predetermined distance, and a second branch electrode 112RX_BR or 212RX_BR of the second electrode 112RX of the first force sensor 100 or the second electrode of the second force sensor 200 may be disposed in each space between the neighboring first branch electrodes 112TX_BR or 212TX_BR. The number of the first branch electrodes 112TX_BR or 212TX_BR disposed in one sensing region SR1 or SR2 may vary depending on the area of the sensing region SR1 or SR2. In an exemplary embodiment, the number of the first branch electrodes 112TX_BR or 212TX_BR disposed in one sensing region SR1 or SR2 may be between about 2 and about 20 based on each first sensing region SR1. The first branch electrodes 112TX_BR or 212TX_BR disposed in the second sensing region SR2 may have the same width and spacing as the first branch electrodes 112TX_BR or 212TX_BR disposed in each first sensing region SR1. However, the number of the first branch electrodes 112TX_BR or 212TX_BR disposed in the second sensing region SR2 may be greater in proportion to the area of the second sensing region SR2.

The second electrode 112RX of the first force sensor 100 or the second electrode of the second force sensor 200 includes a second stem electrode 112RX_ST or 212RX_ST extending in the longitudinal direction, and a plurality of second branch electrodes 112RX_BR or 212RX_BR branching from the second stem electrode 112RX_ST or 212RX_ST.

The second stem electrode 112RX_ST or 212RX_ST faces the first stem electrode 112TX_ST or 212TX_ST. When the first stem electrode 112TX_ST or 212TX_ST is disposed adjacent to the inner side of each of the force sensors 100 and 200, the second stem electrode 112RX_ST or 212RX_ST may be disposed adjacent to the outer side of each of the force sensors 100 and 200. Unlike the first stem electrode 112TX_ST or 212TX_ST, the second stem electrode 112RX_ST or 212RX_ST covers one sensing region SR1 or SR2. The second stem electrode 112RX_ST or 212RX_ST is disposed in each of the sensing regions SR1 and SR2, and the second stem electrodes 112RX_ST or 212RX_ST disposed in different sensing regions SR1 and SR2 are electrically insulated from each other. Each second stem electrode 112RX_ST or 212RX_ST is connected to an independent sensing wiring 112RX_WR or 212RX_WR. Each sensing wiring 112RX_WR or 212RX_WR may extend in one direction and may be connected to a controller. Accordingly, each sensing wiring 112RX_WR or 212RX_WR may transmit data about the voltage or the amount of current applied to a corresponding second electrode 112RX or 212RX to the controller.

The second branch electrodes 112RX_BR or 212RX_BR branch from the second stem electrode 112RX_ST or 212RX_ST and extend in the width direction. The extending direction of the second branch electrodes 112RX_BR or 212RX_BR and the extending direction of the first branch electrodes 112TX_BR or 212TX_BR are opposite to each other. The second branch electrodes 112RX_BR or 212RX_BR are disposed between the first branch electrodes 112TX_BR or 212TX_BR. The number of the first branch electrodes 112TX_BR or 212TX_BR and the number of the second branch electrodes 112RX_BR or 212RX_BR in one sensing region SR1 or SR2 may be equal, however, exemplary embodiments are not limited thereto.

In one sensing region SR1 or ST2, the first branch electrodes 112TX_BR or 212TX_BR and the second branch electrodes 112RX_BR or 212RX_BR may be alternately arranged. A gap between neighboring first and second branch electrodes 112TX_BR and 112RX_BR or 212TX_BR and 212RX_BR in one sensing region SR1 or SR2 may be uniform, however, exemplary embodiments are not limited thereto. A gap between nearest branch electrodes 112TX_BR and 112RX_BR or 212TX_BR and 212RX_BR in different sensing regions SR1 and SR2, which neighbor each other with the non-sensing region NSR interposed between them, may be greater than the gap between the branch electrodes 112TX_BR and 112RX_BR or 212TX_BR and 212RX_BR in one sensing region SR1 or SR2.

In an exemplary embodiment, the second electrode 112RX of the first force sensor 100 and the second electrode of the second force sensor 200 are not disposed in the recess NTH of the first force sensor 100 and in a region of the second force sensor 200 which corresponds to the recess NTH. In some cases, however, the sensing wirings 112RX_WR and 212RX_WR of the second electrode 112RX of the first force sensor 100 and the second electrode of the second force sensor 200 may pass through the above regions.

The force sensing layer 122 or 222 may have a shape corresponding to each of the sensing regions SR1 and SR2. The force sensing layer 122 or 222 covers each of the sensing regions SR1 and SR2. The first branch electrodes 112TX_BR or 212TX_BR and the second branch electrodes 112RX_BR or 212RX_BR in each of the sensing regions SR1 and SR2 may overlap the force sensing layer 122 or 222 in the thickness direction.

The force sensors 100 and 200 described above can be used as input devices for various electronic devices including the display device 1, such as, for example, a smartphone and a tablet PC. The force sensors 100 and 200 can be used in place of physical input buttons or in combination with physical input buttons.

Figure 10:
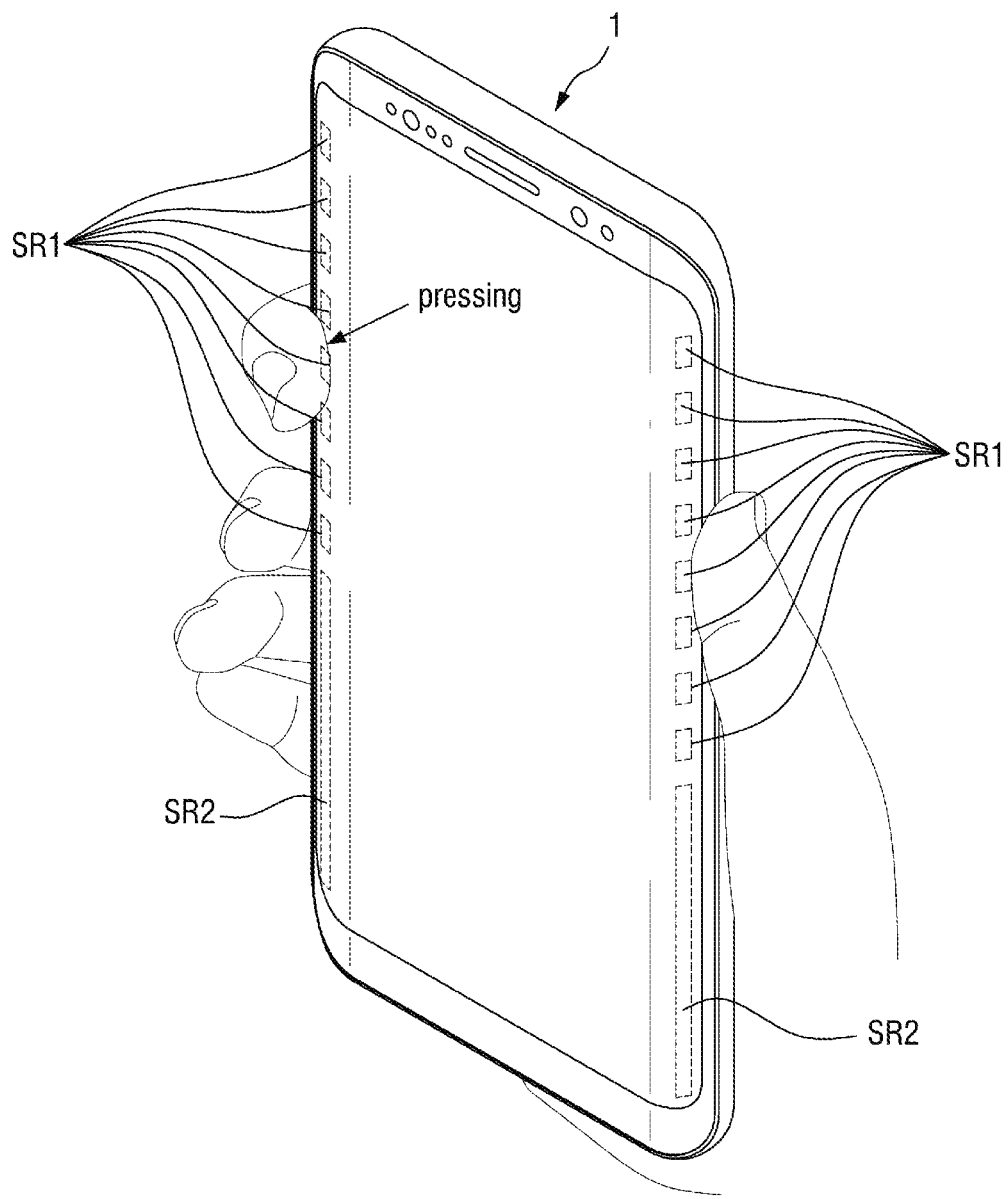
FIGS. 10 and 11 are diagrams illustrating a method of transmitting a force signal to the display device according to an exemplary embodiment.
Figure 11:
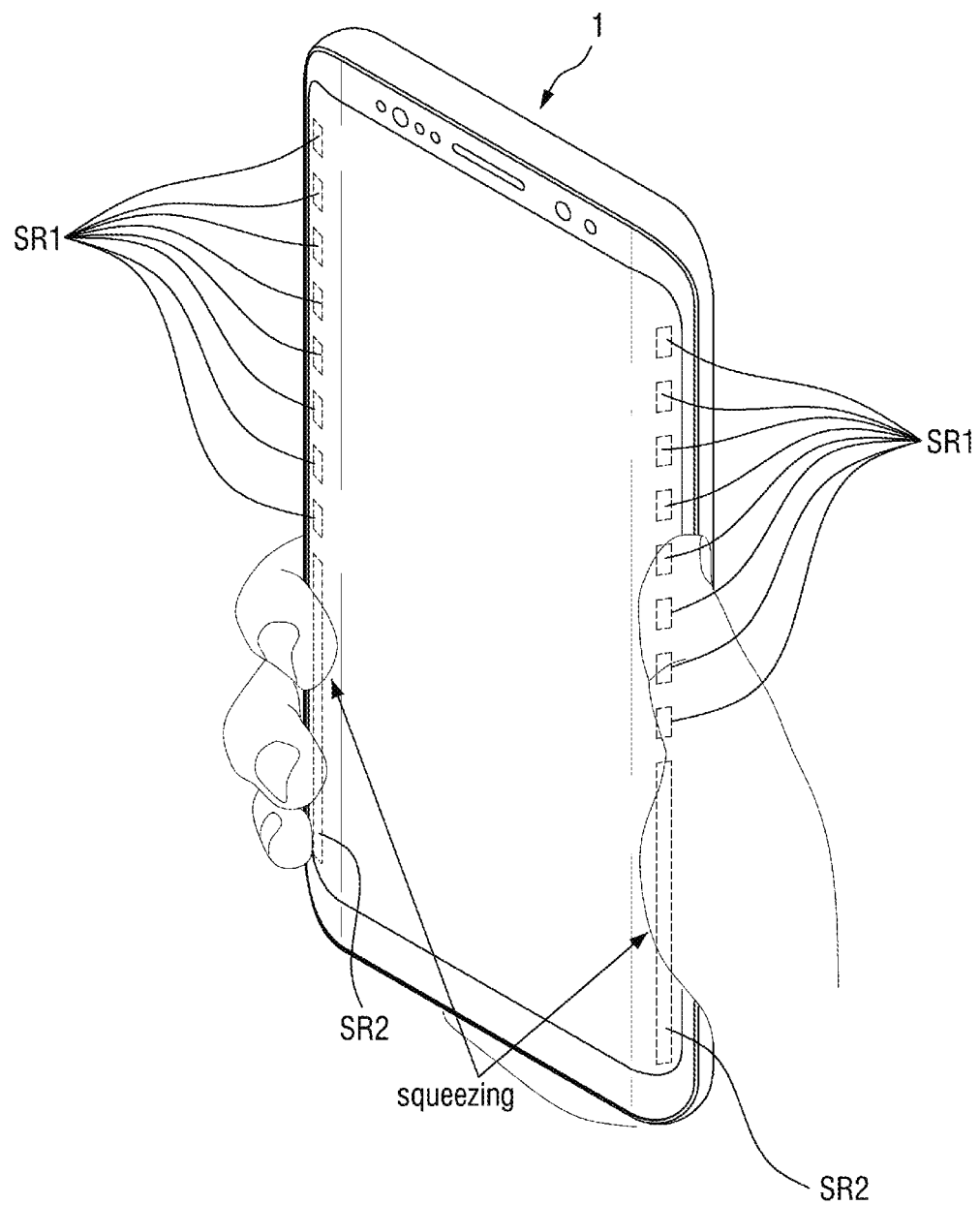

FIGS. 10 and 11 are diagrams illustrating a method of transmitting a force signal to the display device 1 according to an exemplary embodiment.

In FIGS. 10 and 11, the display device 1 is implemented in a smartphone. In the display device 1 of FIGS. 10 and 11, the force sensors 100 and 200 are disposed on the long sides in place of physical input buttons. Thus, according to exemplary embodiments, a smartphone including the display device 1 may be implemented without any physical buttons.

In FIG. 10, a case in which the first sensing regions SR1 are used as pressing recognition regions is illustrated. A pressing recognition region is a region configured to sense a press input operation provided by the user. That is, in FIG. 10, a user is pressing a specific position with an index finger while gripping the display device 1 with fingers. At the specific position, a first sensing region SR1 of the force sensor 100 or 200 is disposed. When the first sensing region SR1 receives a force, the resistance of the force sensing layer 122 or 222 is changed, and the change in the resistance of the force sensing layer 122 or 222 is sensed through the second electrode 112RX of the first force sensor 100 or the second electrode of the second force sensor 200 to identify whether the force has been applied to the specific position, as well as the magnitude of the force. Then, a preprogrammed operation of the display device 1 may be output according to the force and/or the magnitude of the force applied to the specific position. For example, a preprogrammed function such as screen adjustment, screen lock, screen conversion, application calling, application execution, picture taking, or telephone reception may be performed. Different operations may be preprogrammed for different first sensing regions SR1. Therefore, as the number of the first sensing regions SR1 increases, the display device 1 can produce additional outputs.

In FIG. 11, a case in which the second sensing region SR2 is used as a squeezing recognition region is illustrated. A squeezing recognition region is a region configured to sense a squeezing input operation provided by the user. That is, in FIG. 11, the user is squeezing a relatively large area using the palm and fingers while gripping the display device 1 with the fingers. The second sensing region SR2 is disposed in the area in which the squeezing is performed to sense whether a force has been applied by the squeezing, as well as the magnitude of the force. Thus, a preprogrammed operation of the display device 1 may be performed according to the sensing result (e.g., when it is sensed that the second sensing region SR2 has been squeezed).

The user may perform the squeezing operation by naturally applying force using the entire hand while gripping the display device 1. Since the user can quickly perform the squeezing operation without the elaborate movement of the hand while gripping the display device 1, a simpler and quicker input is possible. For example, the user may provide a squeeze input without being concerned with the precise location at which each of the fingers are located on the display device 1. Therefore, the second sensing region SR2 can be used as an input medium for a frequently used function or a program requiring rapid inputs, such as using a camera application to take pictures.

Hereinafter, additional exemplary embodiments will be described. In the following exemplary embodiments, the same components as those described above will be indicated by the same reference numerals. Thus, for convenience of explanation, a redundant description of such components may be omitted or only briefly described. The following exemplary embodiments will be described by focusing mainly on differences with the previously described exemplary embodiment.

Figure 12:
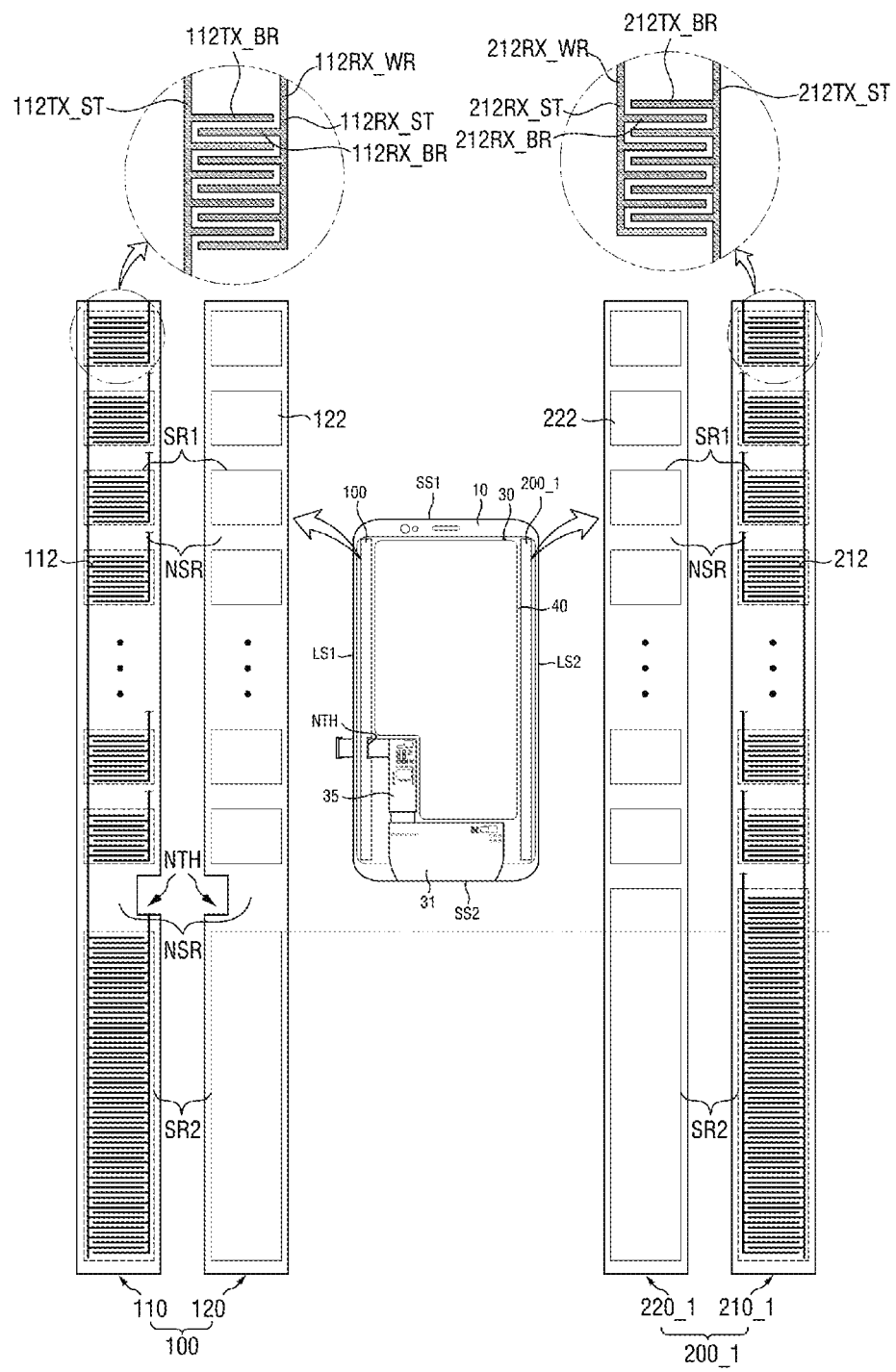
FIG. 12 is a layout view of a first force sensor and a second force sensor according to an exemplary embodiment.

FIG. 12 is a layout view of a first force sensor 100 and a second force sensor 200_1 according to an exemplary embodiment.

The exemplary embodiment f FIG. 12 is different from the exemplary embodiment of FIG. 9 in that a second sensing region SR2 of the second force sensor 200_1 has a wider area than a second sensing region. SR2 of the first force sensor 100. Referring to FIG. 12, the second sensing region SR2 of the second force sensor 200_1 extends further toward an upper end than the second sensing region SR2 of the first force sensor 100. For example, the second sensing region SR2 of the second force sensor 200_1 may extend up to a region corresponding to a recess NTH of the first force sensor 100.

Referring to the squeezing operation of FIG. 11, the areas in which the palm or the fingers naturally touch the first long side and the second long side may be different. The exemplary embodiment of FIG. 12 enables a more precise force measurement in this case.

In FIG. 12, reference numeral 210_1 indicates a first substrate of the second force sensor 200_1, and reference numeral 220_1 indicates a second substrate of the second force sensor 200_1.

Figure 13:
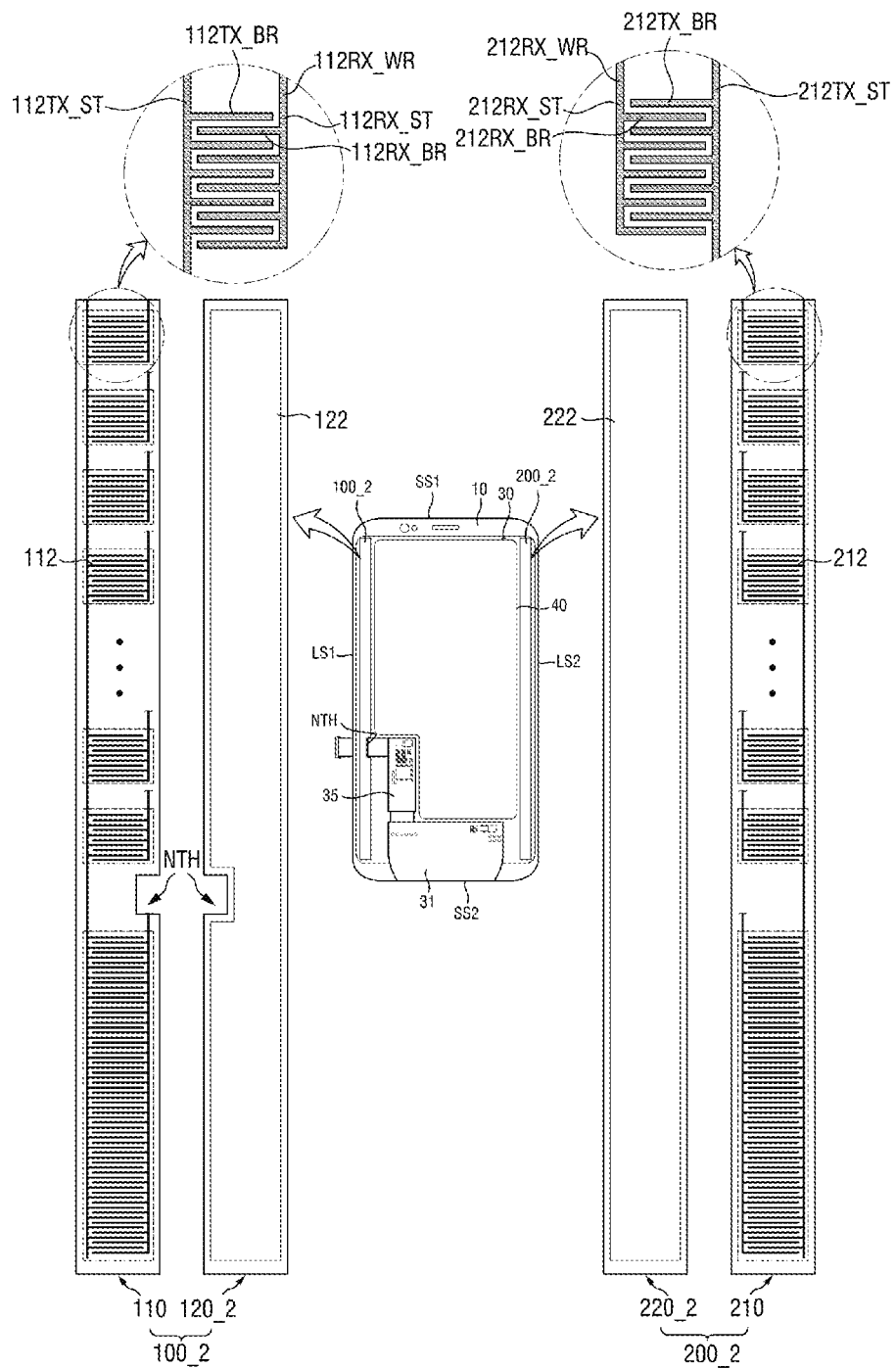
FIG. 13 is a layout view of a first force sensor and a second force sensor according to an exemplary embodiment.

FIG. 13 is a layout view of a first force sensor 100_2 and a second force sensor 200_2 according to an exemplary embodiment.

In FIG. 13, a case in which a force sensing layer 122 or 222 is formed as a single piece without being divided into segments respectively corresponding to sensing regions SR1 and SR2 is illustrated. Referring to FIG. 13, a second substrate 120_2 or 220_2 of each of the first force sensor 100_2 and the second force sensor 200_2 includes the force sensing layer 122 or 222 formed as a single piece. Although the force sensing layer 122 or 222 is formed as a single piece, the second electrode 112RX of the first force sensor 100_2 or the second electrode of the second force sensor 200_2, or the first electrode 112TX of the first force sensor 100_2 or the first electrode of the second force sensor 200_2, is still a functionally separate electrode disposed in each of the sensing regions SR1 and SR2. Therefore, when a force is applied to a specific sensing region SR1 or SR2, the transmission of a sensing signal to other sensing regions SR1 and SR2 can be prevented, thereby preventing the generation of noise at an input position.

Figure 14:
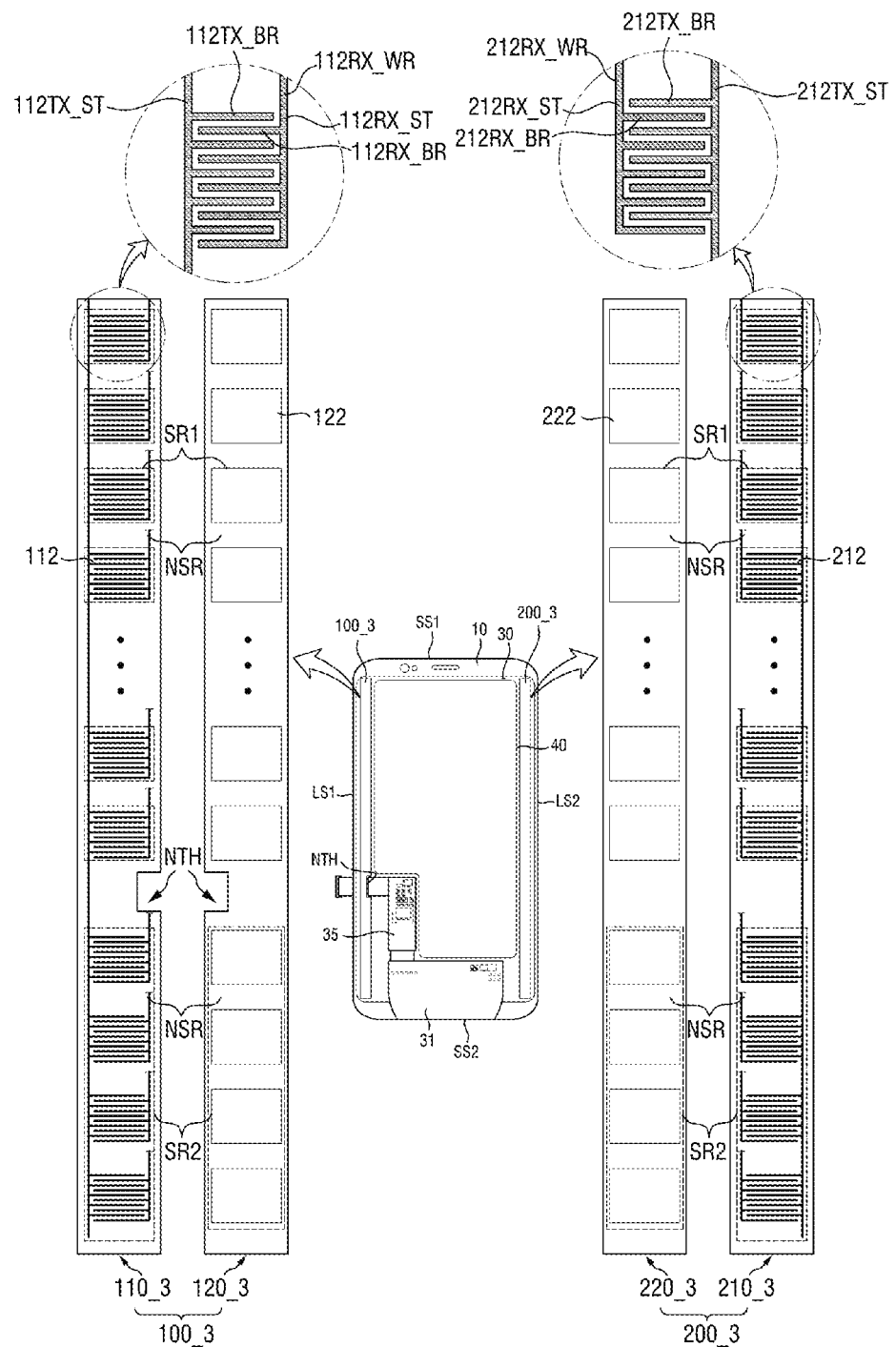
FIG. 14 is a layout view of a first force sensor and a second force sensor according to an exemplary embodiment.

FIG. 14 is a layout view of a first force sensor 100_3 and a second force sensor 200_3 according to an exemplary embodiment. In the exemplary embodiment of FIG. 14, a case in which a non-sensing region NSR is disposed in portions of a second sensing region SR2 of each of the first force sensor 100_3 and the second force sensor 200_3 is illustrated.

Referring to FIG. 14, in the second sensing region SR2 of each of the first and second force sensors 100_3 and 200_3, first branch electrodes 112TX_BR or 212TX_BR and second branch electrodes 112RX_BR or 212RX_BR of a first substrate 110_3 or 210_3 may be arranged similarly to a plurality of first sensing regions SR1. That is, the first branch electrodes 112TX_BR of 212TX_BR and the second branch electrodes 112RX_BR or 212RX_BR are alternately arranged in predetermined numbers at a first interval in the longitudinal direction, are not arranged by a second interval larger than the first interval, and then are alternately arranged again at the first interval. Even in this case, the second branch electrodes 112RX_BR or 212RX_BR in the second sensing region SR2 are electrically connected by one second stem electrode 112RX_ST or 212RX_ST. A force sensing layer 122 or 222 of a second substrate 120_3 or 220_3 may also be patterned like the first sensing regions SR1. However, exemplary embodiments are not limited to this case, and the force sensing layer 122 or 222 in the second sensing region SR2 may also be formed as a single piece as illustrated in FIG. 9 without being patterned.

In the exemplary embodiment of FIG. 14, the first and second electrodes 112TX and 112RX of the first force sensor 100_3, or the first and second electrodes of the second force sensor 200_3, and the force sensing layer 122 or 222, have similar patterns in the first sensing regions SR1 as well as in the second sensing region SR2. Therefore, problems that may occur due to differences in shape can be prevented. Although the non-sensing region NSR is disposed in portions of the second sensing region SR2, since the entire second sensing region SR2 is sensed using one second electrode (e.g., the second electrode 112RX of the first force sensor 100_3 or the second electrode of the second force sensor 200_3) as in the exemplary embodiment of FIG. 9 and a squeezing operation is performed on a wide area, a squeezing input may be accurately recognized.

FIG. 15 is a layout view of a first force sensor 100_4 and a second force sensor 200_4 according to an exemplary embodiment. The exemplary embodiment of FIG. 15 is different from the exemplary embodiment of FIG. 9 in that a second electrode 112RX of the first force sensor 100_4 or a second electrode of the second force sensor 200_4 is formed as a single piece.

Referring to FIG. 15, in an exemplary embodiment, all portions of the second electrode 112RX of the first force sensor 100_4 or the second electrode of the second force sensor 200_4 are connected by a second stem electrode 112RX_ST or 212RX_ST, like a first electrode 112TX of the first force sensor 100_4 or a first electrode of the second force sensor 200_4. Therefore, when a force is applied, it is possible to measure the presence or absence of the force and the magnitude of the force, but it may be difficult to identify a position at which the force has been applied. The first force sensor 100_4 includes a first substrate 110_4 and a second substrate 120_4, and the second force sensor 200_4 includes a first substrate 210_4 and a second substrate 220_4.

The position at which the force has been applied may be identified through a touch member 20 (see FIG. 2). That is, a touch electrode may be disposed in regions of the touch member 20 which overlap the force sensors 100_4 and 200_4. The touch electrode may be used to detect the presence or absence of a touch and the position of the touch. The presence or absence of a force and the magnitude of the force may be measured by the force sensors 100_4 and 200_4 and used as an input signal.

Figure 16:
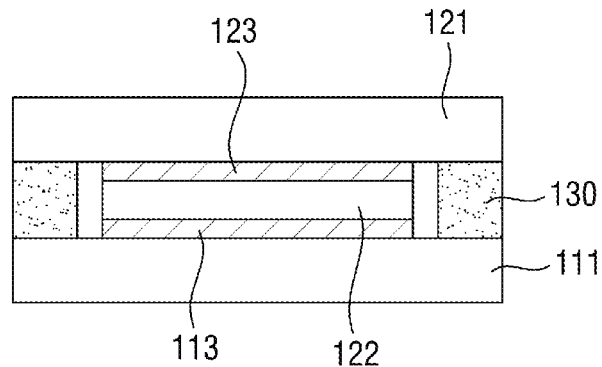
FIG. 16 is a cross-sectional view of a first force sensor according to an exemplary embodiment.
Figure 17:
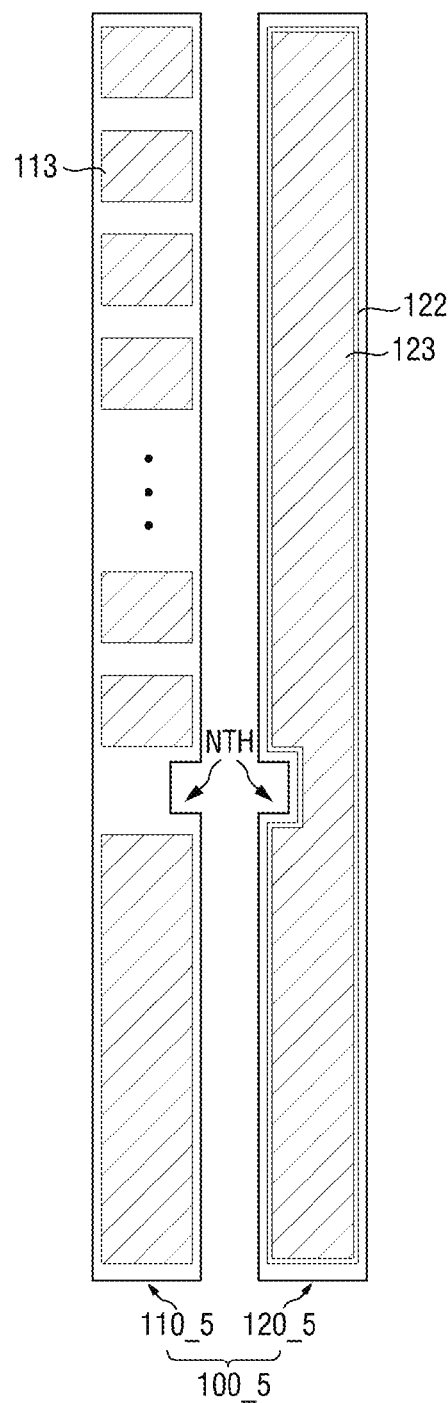
FIG. 17 is a layout view of the first force sensor of FIG. 16.

FIG. 16 is a cross-sectional view of a first force sensor 100_5 according to an exemplary embodiment. FIG. 17 is a layout view of the first force sensor 100_5 of FIG. 16. Referring to FIGS. 16 and 17, the shape and arrangement of first and second electrodes 113 and 123 of the first force sensor 100_5 according to the current exemplary embodiment are different from those of the exemplary embodiment of FIG. 9.

For example, a first substrate 110_5 includes a first base 111 and the first electrode 113 disposed on the first base 111. A second substrate 120_5 includes a second base 121, the second electrode 123 disposed on the second base 121, and a force sensing layer 122 disposed on the second electrode 123. The first electrode 113 faces the force sensing layer 122 and is in contact with or adjacent to the force sensing layer 122.

In the exemplary embodiment of FIGS. 16 and 17, the first electrode 113 and the second electrode 123 face each other in the thickness direction with the force sensing layer 122 interposed between them. When a force is applied, the resistance of the input sensing layer 122 is changed, thereby changing the amount of current flowing between the first electrode 113 and the second electrode 123. Thus, the force input can be sensed.

In FIG. 17, the first electrode 113 is a separate sensing electrode disposed in each sensing region, and the second electrode 123 is a driving electrode formed as a whole-plate electrode. However, the first electrode 113 may also be formed as a whole-plate electrode, and the second electrode 123 may also be formed as a sensing electrode.

Although only the first force sensor 100_5 is illustrated in FIGS. 16 and 17, a second force sensor may also have the same configuration as the first force sensor 100_5 except for the inclusion of a recess NTH.

Figure 18:
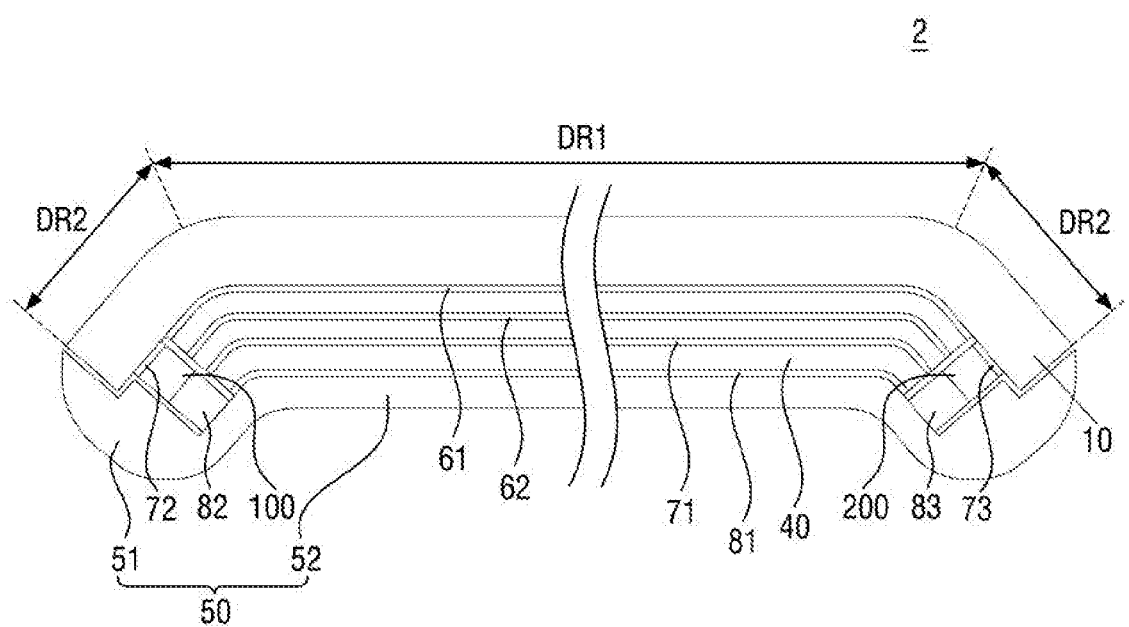
FIG. 18 is a cross-sectional view of a display device according to an exemplary embodiment.

FIG. 18 is a cross-sectional view of a display device 2 according to an exemplary embodiment.

FIG. 18 shows that the attachment position of a first force sensor 100 and a second force sensor 200 in the display device 2 can be changed. That is, as illustrated in FIG. 18, the first force sensor 100 and the second force sensor 200 can be directly attached to a window 10 without overlapping a display panel 30 and a touch member 20.

Figure 19:
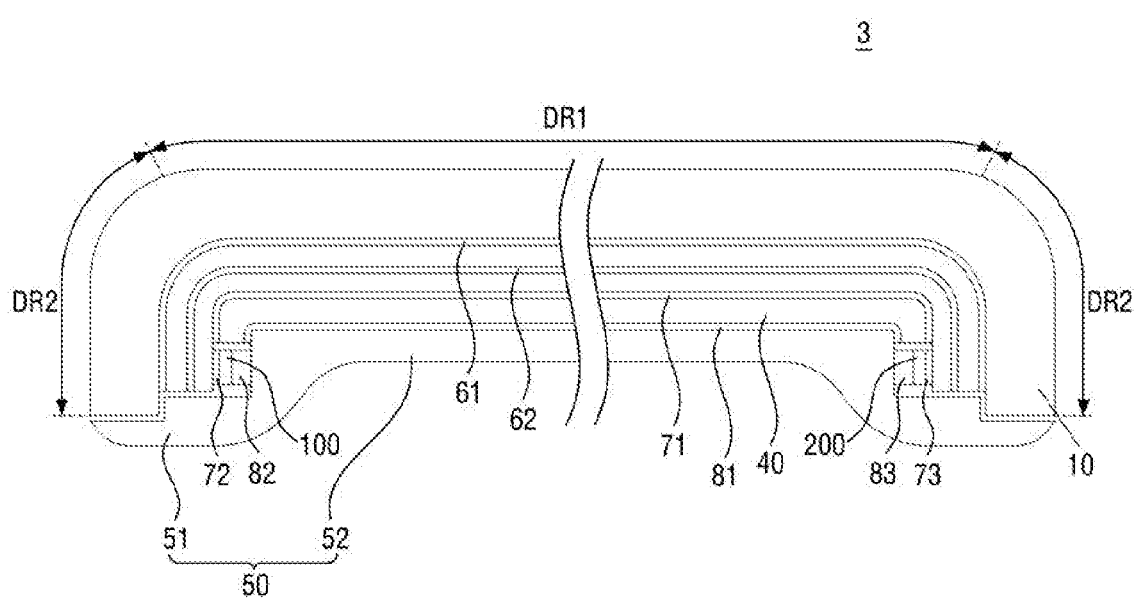
FIG. 19 is a cross-sectional view of a display device according to an exemplary embodiment.

FIG. 19 is a cross-sectional view of a display device 3 according to an exemplary embodiment.

FIG. 19 shows that a second area DR2 of the display device 3 can lie in a plane at an angle of about 90 degrees or more to a first area DR1. The second area DR2 may substantially form side surfaces of the display device 3. The second area DR2 may be a display surface, and may correspond to a non-display area. A first force sensor 100 and a second force sensor 200 are attached to the second area DR2 of the display device 3. Since the first force sensor 100 and the second force sensor 200 are attached to the side surfaces of the display device 3 in the exemplary embodiment of FIG. 19, a user can easily input a force while gripping the display device 3.

A force sensor and a display device according to an exemplary embodiment can prevent a malfunction due to interference between components, and can simplify an input method.

While the present disclosure has been particularly shown and described with reference to the exemplary embodiments thereof, it will be understood by those of ordinary skill in the art that various changes in form and detail may be made therein without departing from the spirit and scope of the present disclosure as defined by the following claims.

What is claimed is:

1. A display device, comprising:
a display panel including a first edge extended in a first direction; and
a first force sensor comprising a substrate and disposed adjacent to the first edge of the display panel and overlapping the display panel, wherein the first force sensor extends along the first edge of the display panel in the first direction,
wherein the first force sensor comprises a plurality of first sensing regions arranged in the first direction and a second sensing region adjacent to the first sensing regions in the first direction, the first sensing regions disposed closer to a first end of the first force sensor than the second sensing region, and the second sensing region disposed closer to a second end of the first force sensor than the first sensing regions,
wherein the first sensing regions are distinct from one another and are separated from one another by a plurality of first non-sensing regions in the first direction,
wherein a length of the second sensing region extending in the first direction is larger than a length of each of the first sensing regions extending in the first direction,
wherein the substrate of the first force sensor comprises an inwardly extending recess disposed at an inner side of the substrate of the first force sensor between an endmost first sensing region among the first sensing regions and the second sensing region in the first direction,
wherein the substrate of the first force sensor comprises a first outermost edge extended in the first direction and a second outermost edge extended in the first direction, and the inwardly extending recess extends inward from the first outermost edge of the substrate of the first force sensor toward the second outermost edge of the substrate of the first force sensor,
wherein the first force sensor comprises a first electrode disposed over the first sensing regions and the second sensing region and including a first stem electrode,
wherein the first stem electrode extends in the first direction in an area adjacent to the endmost first sensing region, is bent a first time in an area between the endmost first sensing region and the second sensing region to extend inward from the first outermost edge of the substrate of the first force sensor toward the second outermost edge of the substrate of the first force sensor in correspondence with the inwardly extending recess, is bent a second time in the area between the endmost first sensing region and the second sensing region to extend in the first direction in correspondence with the inwardly extending recess, is bent a third time in the area between the endmost first sensing region and the second sensing region to extend toward the first outermost edge of the substrate of the first force sensor in correspondence with the inwardly extending recess, and is bent a fourth time in the area between the endmost first sensing region and the second sensing region to extend in the first direction in an area adjacent to the second sensing region to bypass the inwardly extending recess and connect the first sensing regions to the second sensing region.

2. The display device of claim 1, wherein the first force sensor further comprises a second electrode separated from the first electrode,
wherein the second electrode is disposed separately in each of the first and second sensing regions.

3. The display device of claim 2, wherein the first force sensor further comprises a force sensing layer comprising a force sensitive material having a resistance that varies according to a force,
wherein the first electrode and the second electrode contact the force sensing layer.

4. The display device of claim 3, wherein the first electrode further comprises a plurality of first branch electrodes branching from the first stem electrode, and the second electrode comprises a second stem electrode and a plurality of second branch electrodes branching from the second stem electrode,
wherein the first branch electrodes and the second branch electrodes are arranged alternately with each other.

5. The display device of claim 4, wherein the first electrode is a driving electrode, and the second electrode is a sensing electrode.

6. The display device of claim 3, wherein the force sensing layer is disposed separately in each of the first and second sensing regions.

7. The display device of claim 1, wherein the length of the second sensing region is about 30% to about 50% of a total length of the first force sensor.

8. The display device of claim 1, further comprising:
a second force sensor disposed adjacent to a second edge of the display panel and overlapping the display panel, wherein the second edge of the display panel faces the first edge of the display panel and the second force sensor extends along the second edge of the display panel,
wherein the second force sensor comprises a plurality of third sensing regions and a fourth sensing region, the third sensing regions disposed closer to a first end of the second force sensor than the fourth sensing region, and the fourth sensing region disposed closer to a second end of the second force sensor than the third sensing regions,
wherein the third sensing regions are distinct from one another and are separated from one another by a plurality of second non-sensing regions,
wherein the fourth sensing region has a larger area than each of the third sensing regions.

9. The display device of claim 8, wherein the first sensing regions and the third sensing regions are pressing recognition regions, and the second sensing region and the fourth sensing region are squeezing recognition regions.

10. The display device of claim 9, wherein the display panel includes
a flat portion,
a first curved portion connected to the flat portion, and
a second curved portion connected to the flat portion,
wherein the first curved portion is disposed at the first edge of the display panel, the second curved portion is disposed at the second edge of the display panel, the first force sensor overlaps the first curved portion of the display panel, and the second force sensor overlaps the second curved portion of the display panel.

11. The display device of claim 10, wherein the first force sensor and the second force sensor are attached to a lower surface of the display panel.

12. The display device of claim 11, further comprising:
a bracket that houses the display panel, the first force sensor, and the second force sensor,
wherein the first force sensor is attached to the bracket with a first waterproof tape, and the second force sensor is attached to the bracket with a second waterproof tape.

13. A display device, comprising:
a display panel including a first edge extended in a first direction; and
a first force sensor comprising a substrate and disposed adjacent to the first edge of the display panel and overlapping the display panel, wherein the first force sensor extends along the first edge of the display panel in the first direction, and the substrate of the first force sensor comprises an inwardly extending recess disposed at an inner side of the first force sensor,
wherein the substrate of the first force sensor comprises a first outermost edge extended in the first direction and a second outermost edge extended in the first direction, and the inwardly extending recess extends inward from the first outermost edge of the substrate of the first force sensor toward the second outermost edge of the substrate of the first force sensor,
wherein the first force sensor comprises a plurality of first sensing regions arranged in the first direction and a second sensing region adjacent to the first sensing regions in the first direction,
wherein the first sensing regions are distinct from one another and are separated from one another by a plurality of first non-sensing regions in the first direction,
wherein the inwardly extending recess is disposed between an endmost first sensing region among the first sensing regions and the second sensing region in the first direction, and
wherein a length of the second sensing region extending in the first direction is larger than a length of each of the first sensing regions extending in the first direction,
wherein the first force sensor comprises a first electrode disposed over the first sensing regions and the second sensing region and including a first stem electrode,
wherein the first stem electrode extends in the first direction in an area adjacent to the endmost first sensing region, is bent a first time in an area between the endmost first sensing region and the second sensing region to extend inward from the first outermost edge of the substrate of the first force sensor toward the second outermost edge of the substrate of the first force sensor in correspondence with the inwardly extending recess, is bent a second time in the area between the endmost first sensing region and the second sensing region to extend in the first direction in correspondence with the inwardly extending recess, is bent a third time in the area between the endmost first sensing region and the second sensing region to extend toward the first outermost edge of the substrate of the first force sensor in correspondence with the inwardly extending recess, and is bent a fourth time in the area between the endmost first sensing region and the second sensing region to extend in the first direction in an area adjacent to the second sensing region to bypass the inwardly extending recess and connect the first sensing regions to the second sensing region.

14. The display device of claim 13, wherein the inwardly extending recess is notch-shaped.

15. The display device of claim 13, wherein the first force sensor further comprises a second electrode separated from the first electrode,
wherein the second electrode is disposed separately in each of the first and second sensing regions.

16. The display device of claim 15, wherein the first force sensor further comprises a force sensing layer comprising a force sensitive material having a resistance that varies according to a force,
wherein the first electrode and the second electrode contact the force sensing layer.

17. The display device of claim 16, wherein the first electrode further comprises a plurality of first branch electrodes branching from the first stem electrode, and the second electrode comprises a second stem electrode and a plurality of second branch electrodes branching from the second stem electrode,
wherein the first branch electrodes and the second branch electrodes are arranged alternately with each other.

18. The display device of claim 17, wherein the first electrode is a driving electrode, and the second electrode is a sensing electrode.

19. The display device of claim 16, wherein the force sensing layer is disposed separately in each of the first and second sensing regions.

20. The display device of claim 13, wherein the length of the second sensing region is about 30% to about 50% of a total length of the first force sensor.

21. The display device of claim 13, wherein each first sensing region of the first force sensor is a pressing recognition region, and the second sensing region of the first force sensor is a squeezing recognition region.

22. The display device of claim 13, wherein the first electrode is formed as a single piece along a direction in which the first force sensor extends, and the first force sensor further comprises a second electrode formed as a single piece along the direction in which the first force sensor extends,
wherein the second electrode is separated from the first electrode.

23. The display device of claim 22, further comprising:
a touch member disposed on the display panel, wherein the touch member comprises a touch electrode overlapping the first force sensor.

24. The display device of claim 13, further comprising:
a bracket that houses the display panel and the first force sensor,
wherein the bracket comprises a connect hole through which a connector passes, and the inwardly extending recess bypasses the connect hole in an outward direction.

25. The display device of claim 13, further comprising:
a second force sensor disposed adjacent to a second edge of the display panel that faces the first edge of the display panel.

26. The display device of claim 25, wherein the second force sensor does not comprise the inwardly extending recess disposed in the first force sensor or any other recess.

27. The display device of claim 25, wherein the second force sensor comprises a plurality of third sensing regions disposed between a first end of the second force sensor and a second end of the second force sensor, and a fourth sensing region disposed closer to the second end of the second force sensor than the third sensing regions,
wherein the third sensing regions are distinct from one another and are separated from one another by a plurality of second non-sensing regions,
wherein the fourth sensing region has a wider area than each of the third sensing regions.

28. A force sensor, comprising:
a first substrate comprising an inwardly extending recess;
a first outermost edge of the first substrate extended in a first direction;
a second outermost edge of the first substrate extended in the first direction,
wherein the inwardly extending recess is disposed at the first outermost edge of the first substrate of the force sensor, and the inwardly extending recess extends inward from the first outermost edge of the first substrate of the force sensor toward the second outermost edge of the first substrate of the force sensor;
a plurality of first sensing regions that sense a first force and are arranged in the first direction;
a second sensing region that senses a second force and is adjacent to the first sensing regions in the first direction,
wherein the first sensing regions are distinct from one another and are separated from one another by a plurality of non-sensing regions in the first direction,
wherein the inwardly extending recess is disposed between an endmost first sensing region among the first sensing regions and the second sensing region in the first direction,
wherein a length of the second sensing region extending in the first direction is larger than a length of each of the first sensing regions extending in the first direction; and
a first electrode disposed over the first sensing regions and the second sensing region and including a first stem electrode,
wherein the first stem electrode extends in the first direction in an area adjacent to the endmost first sensing region, is bent a first time in an area between the endmost first sensing region and the second sensing region to extend inward from the first outermost edge of the substrate of the first force sensor toward the second outermost edge of the substrate of the first force sensor in correspondence with the inwardly extending recess, is bent a second time in the area between the endmost first sensing region and the second sensing region to extend in the first direction in correspondence with the inwardly extending recess, is bent a third time in the area between the endmost first sensing region and the second sensing region to extend toward the first outermost edge of the substrate of the first force sensor in correspondence with the inwardly extending recess, and is bent a fourth time in the area between the endmost first sensing region and the second sensing region to extend in the first direction in an area adjacent to the second sensing region to bypass the inwardly extending recess and connect the first sensing regions to the second sensing region.

29. The force sensor of claim 28, further comprising:
a second substrate that faces the first substrate and comprises a force sensing layer,
wherein the first substrate comprises an electrode layer.

30. The force sensor of claim 29, wherein the electrode layer comprises the first electrode and a second electrode separated from the first electrode,
  wherein the second electrode is disposed separately in each of the first and second sensing regions.

31. The force sensor of claim 30, wherein the first electrode is a driving electrode, and the second electrode is a sensing electrode.

32. The force sensor of claim 31, wherein the first electrode and the second electrode are comb-shaped and engaged with each other.

33. The force sensor of claim 30, wherein the force sensing layer comprises a force sensitive material having a resistance that varies according to a force,
  wherein the first electrode and the second electrode contact the force sensing layer.

34. The force sensor of claim 33, wherein the force sensing layer is disposed separately in each of the first and second sensing regions.

35. The force sensor of claim 29, further comprising:
  a bonding layer disposed between the first substrate and the second substrate along edges of the first substrate and the second substrate,
  wherein the bonding layer bonds the first substrate and the second substrate together and seals an internal space.

36. The force sensor of claim 28, wherein the length of the second sensing region is about 30% to about 50% of a total length of the force sensor.

* * * * *